US012722690B2

(12) United States Patent
Saito et al.

(10) Patent No.: US 12,722,690 B2
(45) Date of Patent: Sep. 1, 2026

(54) STEERING DEVICE

(71) Applicant: Knorr-Bremse Commercial Vehicle Systems Japan Ltd., Sakado (JP)

(72) Inventors: Hiroki Saito, Hiki-gun (JP); Shinji Nakamura, Maebashi (JP)

(73) Assignee: KNORR-BREMSE COMMERCIAL VEHICLE SYSTEMS JAPAN LTD, Sakado (JP)

( * ) Notice: Subject to any disclaimer, the term of this patent is extended or adjusted under 35 U.S.C. 154(b) by 456 days.

(21) Appl. No.: 18/268,811

(22) PCT Filed: Nov. 26, 2021

(86) PCT No.: PCT/JP2021/043343
§ 371 (c)(1),
(2) Date: Jun. 21, 2023

(87) PCT Pub. No.: WO2022/137978
PCT Pub. Date: Jun. 30, 2022

(65) Prior Publication Data
US 2024/0294207 A1 Sep. 5, 2024

(30) Foreign Application Priority Data
Dec. 22, 2020 (JP) ................................ 2020-212848

(51) Int. Cl.
*B62D 5/04* (2006.01)
*B62D 5/083* (2006.01)

(52) U.S. Cl.
CPC ........... *B62D 5/0454* (2013.01); *B62D 5/083* (2013.01)

(58) Field of Classification Search
CPC ........ B62D 5/083; B62D 5/0454; B62D 5/24; B62D 5/0421; F16H 1/16
See application file for complete search history.

(56) References Cited

U.S. PATENT DOCUMENTS

2002/0117348 A1* 8/2002 Shimizu ............... B62D 5/0406 180/443
2005/0178608 A1* 8/2005 Shiino .................. B62D 5/0409 180/444

(Continued)

FOREIGN PATENT DOCUMENTS

DE 10206702 A1 * 9/2002 ........... B62D 5/0406
DE 102017219161 A1 * 4/2018 ........... B62D 5/0463

(Continued)

OTHER PUBLICATIONS

International Preliminary Report on Patentability and Written Opinion issued in International Patent Application No. PCT/JP2021/043343 dated Jul. 6, 2023 (12 pages).

(Continued)

*Primary Examiner* — John Olszewski
*Assistant Examiner* — Matthew D Lee
(74) *Attorney, Agent, or Firm* — Foley & Lardner LLP

(57) ABSTRACT

A steering device includes: a steering shaft; a transmitting mechanism configured to transmit the rotation of the steering shaft to a steered wheel; a power cylinder; a rotary valve configured to selectively supply a hydraulic fluid to the pair of the fluid chambers in accordance with the rotation of the steering shaft; and an electric motor configured to provide a rotation force through a speed reduction device to the steering shaft, the steering shaft including a first shaft connected to the steering wheel, and a second shaft connected to the first shaft, and configured to output the rotation force inputted from the first shaft, to the transmitting mechanism side, and the electric motor being connected through the speed reduction device to the second shaft.

13 Claims, 18 Drawing Sheets

(56) References Cited

U.S. PATENT DOCUMENTS

| | | | | |
|---|---|---|---|---|
| 2007/0209864 | A1* | 9/2007 | Segawa | B62D 5/0409 180/446 |
| 2012/0241244 | A1* | 9/2012 | Escobedo | B62D 5/0421 180/444 |
| 2016/0107681 | A1* | 4/2016 | Dutsky | B62D 5/0835 180/422 |
| 2021/0163060 | A1* | 6/2021 | Fujita | B62D 5/001 |
| 2023/0142494 | A1* | 5/2023 | Shastry | B62D 5/0454 180/444 |
| 2024/0034392 | A1* | 2/2024 | Ko | B62D 3/10 |

FOREIGN PATENT DOCUMENTS

| | | | |
|---|---|---|---|
| JP | H11-005552 | A | 1/1999 |
| JP | 2010-071375 | A | 4/2010 |
| JP | 2019-026915 | A | 2/2019 |
| JP | 2019-098940 | A | 6/2019 |
| JP | 2019-156082 | A | 9/2019 |
| WO | WO-2007/037499 | A1 | 4/2007 |

OTHER PUBLICATIONS

International Search Report of International Patent Application No. PCT/JP2021/043343 dated Feb. 8, 2022 (7 pages).

* cited by examiner

STEERING DEVICE

TECHNICAL FIELD

This invention relates to a steering device.

BACKGROUND ART

There has been known a steering device described in, for example, a patent document 1 described later.

In the steering device described in the patent document 1, a steering shaft includes a first shaft connected to a steering wheel; a second shaft connected to the first shaft, and configured to output a rotation force inputted from this first shaft to a transmitting mechanism side; and a connection shaft which rotatably receives the first shaft, and which is connected through a spline portion to the second shaft. Moreover, the connection shaft is connected through a speed reduction device to an electric motor.

PRIOR ART DOCUMENT

Patent Document

Japanese Patent Application No. 2019-026915

SUMMARY OF THE INVENTION

Problems Which the Invention is Intended to Solve

In the steering device described in the patent document 1, the connection shaft and the second shaft are connected through the spline portion. Accordingly, a backlash is generated between the connection shaft and the second shaft due to the connection between the connection shaft and the second shaft. Therefore, when the electric motor provides the rotation force through the speed reduction device to the connection shaft, the second shaft may be rotated in accordance with the deterioration of the response due to the backlash.

It is, therefore, an object of the present invention to provide a steering device devised to solve the above-described problems, and to improve a response of a rotation force with respect to a second shaft.

Means for Solving the Problem

In the present invention, in an aspect, an electric motor is configured to provide a rotation force through a speed reduction device to a second shaft.

Benefit of the Invention

By the present invention, it is possible to improve the response of the rotation force with respect to the second shaft.

DESCRIPTION OF EMBODIMENTS

First Embodiment (Configuration of Steering Device)

Figure 1:
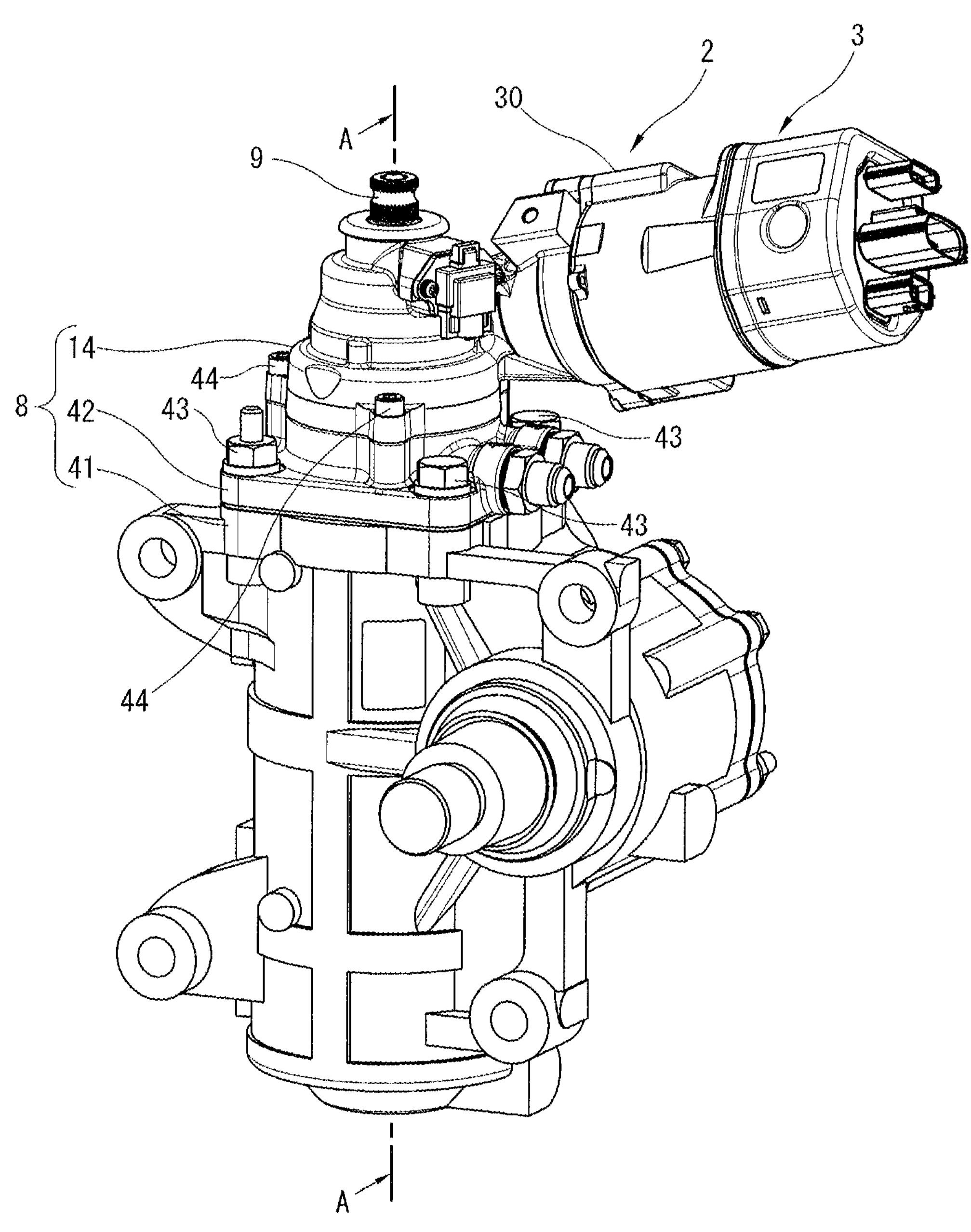
FIG. 1 is a perspective view showing a steering device according to a first embodiment.
Figure 2:
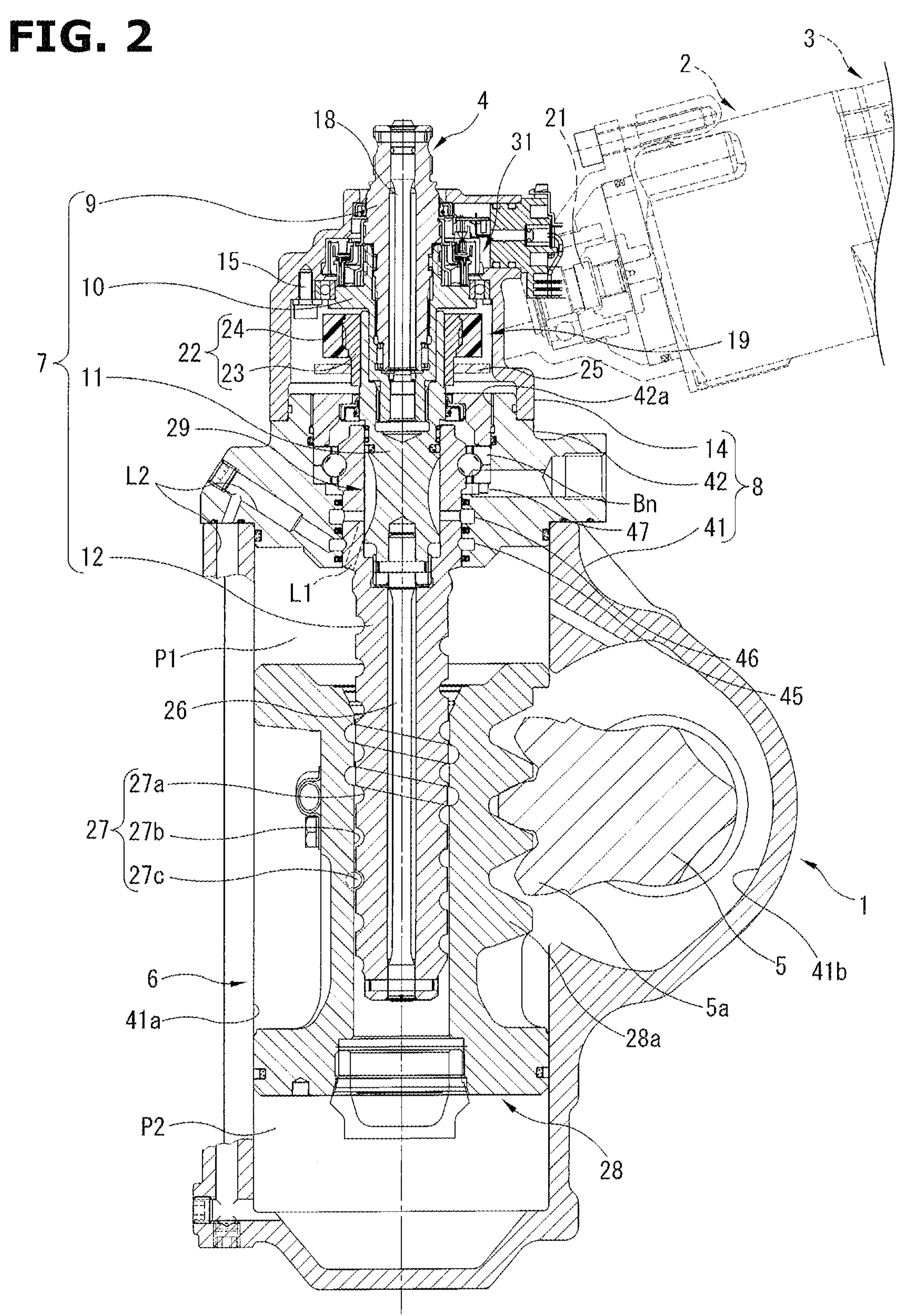
FIG. 2 is a longitudinal sectional view which shows the steering device according to the first embodiment, and which is taken along a line A-A of FIG. 1.
Figure 3:
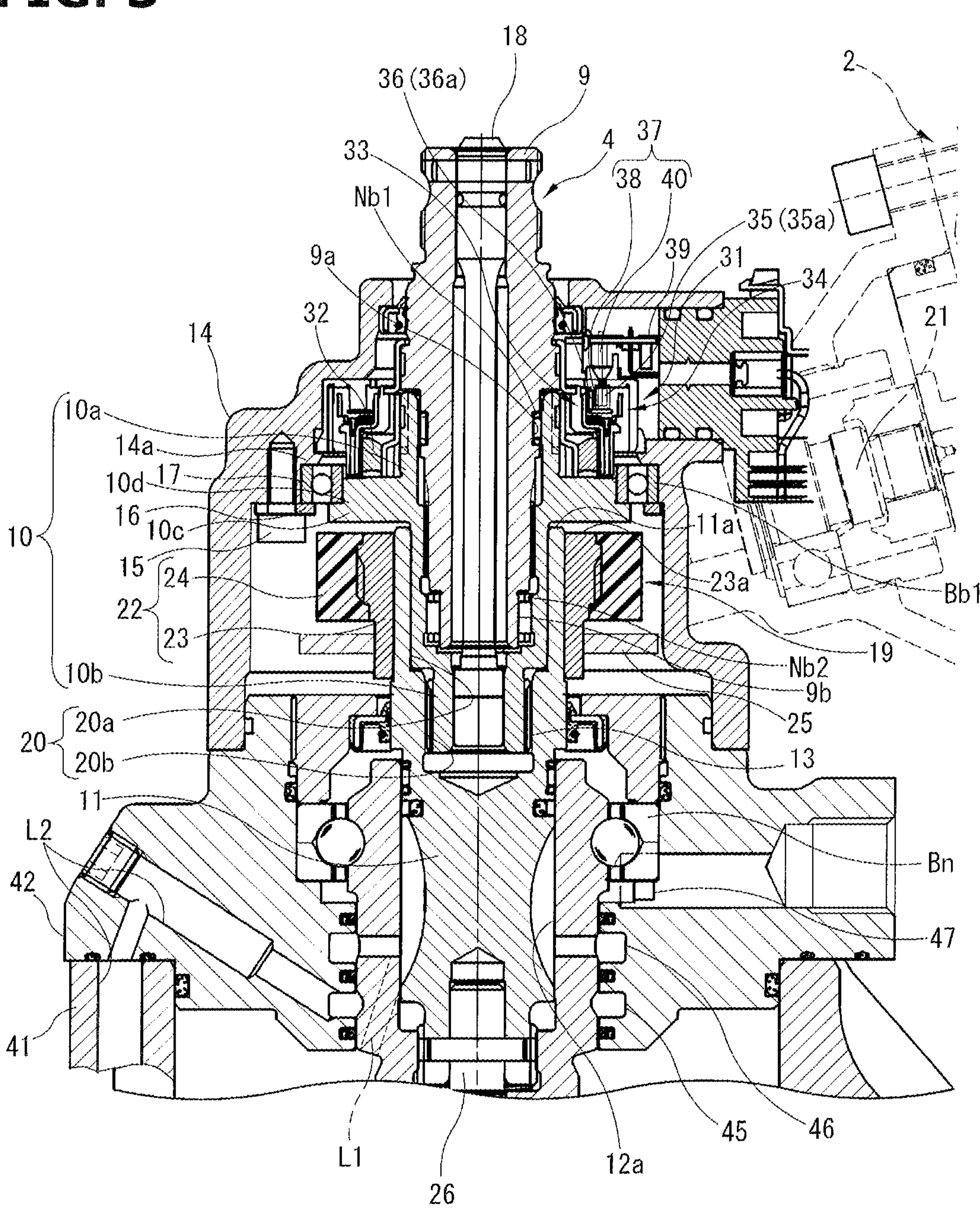
FIG. 3 is a partially enlarged sectional view showing the steering device of FIG. 2.

FIG. 1 is a perspective view showing a steering device according to a first embodiment. FIG. 2 is a longitudinal sectional view which shows a steering device according to the first embodiment, and which is taken along a line A-A of FIG. 1. FIG. 3 is a partially enlarged sectional view of the steering device of FIG. 2. In FIG. 1 to FIG. 3, for the explanation, an "axial direction" is defined by a longitudinal direction of a steering shaft 7. A "radial direction" is defined by a direction perpendicular to the steering shaft 7. Moreover, a "circumferential direction" is defined by a direction around the steering shaft 7. Furthermore, a "first end" is defined by a side (upper sides in the drawings) which is linked with a steering wheel (not shown) in the axial direction. A "second side" is defined by a side (lower sides in the drawings) which is linked with a piston 28 in the axial direction. Besides, in FIG. 2 and FIG. 3, an electric motor 2, an EPS controller 3, a worm shaft 21 and so on are represented by dotted lines.

The steering device is an integral type steering device used in large vehicles and so on. The steering device mainly includes a steering device main body 1, an electric motor 2, and an EPS controller (ECU) 3.

The steering device main body 1 includes a steering mechanism 4, a sector shaft 5, and a power cylinder 6.

The steering device 4 serves for an input of the rotational force from a steering wheel (not shown). The steering device 4 includes a steering shaft 7. A part of the steering shaft 7 is received within a housing 8. The steering shaft 7 includes an input shaft 9, a connection shaft 10, an intermediate shaft 11, and an output shaft 12.

The input shaft 9 has a cylindrical shape. The input shaft 9 includes a first end side which is linked with the steering wheel, and which serves for the input of the steering torque of the driver. Moreover, as shown in FIG. 2 and FIG. 3, the input shaft 9 includes a second end portion inserted into the connection shaft 10 having a substantially cylindrical shape. The input shaft 9 includes a first annular receiving groove 9*a* which is formed on an outer circumference portion of the input shaft 9 at a central portion in the axial direction, and which receives a first needle bearing Nb1. The input shaft 9 includes an annular recessed portion 9*b* which is formed at a second end in the axial direction, and which receives a second needle bearing Nb2. The input shaft 9 is rotatably supported on an inner circumference surface of the connection shaft 10 through the first and second needle bearings Nb1 and Nb2.

The connection shaft 10 includes a first end side receiving the second end portion of the input shaft 9; and a second end side connected through a spline portion 13 to the intermediate shaft 11. With this, the connection shaft 10 connects the input shaft 9 and the intermediate shaft 11. Besides, the second end side of the connection shaft 10 may be connected through a screw portion to the intermediate shaft 11, in place of the spline portion 13. As shown in FIG. 3, the connection shaft 10 has a continuously stepped cylindrical shape having a diameter decreased from the first end side to the second end side. The connection shaft 10 includes a large diameter cylindrical portion 10*a* positioned on the first end side; and a small diameter cylindrical portion 10*b* which is integrally formed with the large diameter cylindrical portion 10*a*, and which has a diameter smaller than a diameter of the large diameter cylindrical portion 10*a*. The connection shaft 10 includes a protruding portion 10*c* which is positioned slightly above an axially central portion on the outer circumference portion of the large diameter portion 10*a*, and which has an annular shape protruding in the radially outward direction.

As shown in FIG. 3, the annular protruding portion 10*c* includes a stepped portion 10*d* which is formed on a radial end surface of the annular protruding portion 10*c* on the first end side, and which has a stepped shape having a decreasing diameter. A first ball bearing Bb1 is provided between the stepped portion 10*d* and the inner circumference wall of the input side housing 14 constituting a part of the housing 8. The first ball bearing Bb1 rotatably supports the connection shaft 10. The first ball bearing Bb1 is fixed to the input side housing 14 by pressing an outer race 17 of the first ball bearing Bb1 against a stepped portion 14*a* of the input side housing 14 by a fastening ring (retaining ring) 16 toward the first end side, by a tightening force generated when the first ball bearing Bb1 is fixed through a bolt 15 to the input side housing 14.

Moreover, an outer circumference portion of the small diameter cylindrical portion 10*b* is fixed through the spline portion 13 to the inner circumference portion of a small diameter recessed portion 20*b* (described later) of the cylindrical intermediate shaft 11.

The intermediate shaft 11 includes a first end side connected to the input shaft 9 through a first torsion bar 18 to be rotated relative to the input shaft 9. The intermediate shaft 11 serves for the input of the driving torque of the electric motor 2 through a speed reduction device 19 provided at the outer circumference portion. A first axial end surface 11*a* of the intermediate shaft 11 includes a receiving recessed portion 20 which is opened to the first end side, and which receives a portion of the connection shaft 10 which is located on the second end side of the annular protruding portion 10*c*. The receiving recessed portion 20 includes a large diameter recessed portion 20*a* which has a circular shape having an inside diameter corresponding to an outside diameter of the second end side of the large diameter cylindrical portion 10*a* of the connection shaft 10, and which is located on the first end side; and the small diameter recessed portion 20*b* which has a circular shape having an inside diameter corresponding to an outside diameter of the small diameter cylindrical portion 10*b*, and which is positioned adjacent to the large diameter recessed portion 20*a* in the axial direction. The speed reduction device 19 is provided at the outer circumference portion of the intermediate shaft 11 on the first end side. The speed reduction device 19 is connected to the electric motor 2. The speed reduction device 19 is constituted by a worm gear constituted by an engagement between a worm shaft 21 and a worm wheel 22.

The worm wheel 22 includes a core metal portion 23 which has a cylindrical shape, and which is made from a metal; and a helical teeth portion 24 which is provided on an outer circumference portion of the core metal portion 23 on the first end side, and which is made from the synthetic resin. Besides, the helical teeth portion 24 may be made from the metal material. The core metal portion 23 has an axial length longer than an axial length of the helical teeth portion 24. The core metal portion 23 is press-fit on the outer circumference portion of the first end side of the intermediate shaft 11, more specifically, an axial region of the outer circumference portion of the large diameter recessed portion 20*a*, and a part of the outer circumference portion of the small diameter recessed portion 20*b* which is adjacent to the outer circumference portion of the large diameter recessed portion 20*a* in the axial direction, by pressing an axial end surface 23*a* on the first end side of the core metal portion 23, toward the second end side by using a first press-fit device 48 (described later). As shown in FIG. 3, the axial end surface 23*a* is positioned on the second end side of the first axial end surface 11*a* of the intermediate shaft 11, in a state in which the core metal portion 23 is press-fit on the outer circumference portion of the intermediate shaft 11. Moreover, the core metal portion 23 may be mounted on the outer circumference portion of the intermediate shaft 11 by the shrink fit or the cold fit, in place of the method in which the core metal portion 23 is mounted on the outer circumference portion of the intermediate shaft 11 by the press fit. Furthermore, the core metal portion 23 may be mounted to the outer circumference portion of the intermediate shaft 11 by using the wedge screw, the adhesive, or the spline, in place of the press fit, the shrink fit, or the cold fit. Besides, in a case in which the core metal portion 23 is mounted on the outer circumference portion of the intermediate shaft 11 by using the spline and so on, the spline may be coated with the resin, or the pin may be inserted into the spline, so as to suppress the backlash between the intermediate shaft 11 and the core metal portion 23. The helical teeth portion 24 is engaged with the worm (not shown) formed on the outer circumference of the worm shaft 21.

An annular grease spread preventing member 25 is provided at an outer circumference portion of the second end side of the core metal portion 23. The grease spread preventing member 25 is configured to suppress the insertion (entering) of the grease leaked from the engagement portion between the helical teeth portion 24 and the worm, toward the output shaft 12 side. The grease spread preventing member 25 has an outside diameter greater than an outside diameter of the helical teeth portion 24. The grease spread preventing member 25 is fixed on the outer circumference portion of the core metal portion 23 on the lower end side, for example, by the press fit. Besides, the fixation of the grease spread preventing member 25 is not limited to the fixation by the press fit. The fixation of the grease spread preventing member 25 may be the fixation by a fixing member such as a screw. Moreover, the grease spread preventing member 25 may be adhered to the outer circumference portion of the core metal portion 23 on the lower end side by the adhesive, in place of the fixation by the screw and so on.

Moreover, the second end side of the intermediate shaft 11 is inserted into an opening recessed portion 12*a* formed on the first end side diameter increasing portion of the output shaft 12. The output shaft 12 includes a first end side connected to the intermediate shaft 11 through the second torsion bar 26 to be rotated relative to the intermediate shaft 11. The output shaft 12 is configured to output the steering torque inputted by this intermediate shaft 11, to a piston 28 through a ball screw mechanism 27 which is a conversion mechanism.

The ball screw mechanism 27 is constituted by the output shaft 12 which is a screw shaft that includes an outer circumference portion which is positioned on the second end side, and on which a ball groove 27*a* that is a helical groove is formed; the piston 28 which is a nut that is provided radially outside the output shat 12, and that includes an inner circumference portion on which a ball groove 27*b* that is a helical groove corresponding to the ball groove 27*a* is formed; and a plurality of balls 27*c* (a part of the balls 27*c* is shown by a dotted line in FIG. 2) provided between the piston 28 and the output shaft 12.

A known rotary valve 29 which is a control valve is constituted between the intermediate shaft 11 and the output shaft 12. The rotary valve 29 is configured to selectively supply the hydraulic fluid supplied by a pump device (not shown) mounted on the vehicle to first and second fluid chambers (pressure chambers) P1, P2 in accordance with a torsion amount and a torsion direction of the second torsion bar 26 which are determined by a relative rotation angle between the intermediate shaft 11 and the output shaft 12.

The sector shaft 15 includes a sector gear 5*a*. The sector shaft 5 is configured to be pivoted in accordance with the axial movement of the piston 28 by the engagement between the sector gear 5*a* and rack teeth 28*a* of the piston 28 provided on the outer circumference of the second end side of the steering shaft 7. The sector shaft 5 is linked with the steered wheels through a pitman arm (not shown) to serve for the steering.

In this way, the ball screw mechanism 27, the sector shaft 5, and the pitman arm constitute a transmitting mechanism configured to convert the rotation force (the steering force) inputted to the steering shaft 7, to the turning force of the steered wheels. Besides, in a case in which the steering device is constituted without using the ball screw mechanism 27 and so on, for example, a rack bar, a pinion shaft, and so on which constitute a rack and pinion mechanism can be used as the transmitting mechanism.

A power cylinder 6 is constituted by defining the first and second fluid chambers P1 and P2 which are a pair of fluid chambers, by the cylindrical piston 28 slidably received within the housing 8. The power cylinder 6 is a hydraulic actuator configured to generate the assist torque for assisting the steering torque.

The electric motor 2 is a three-phase alternating current brushless motor configured to provide the rotation torque to the intermediate shaft 11 in accordance with the torsion amount of the first torsion bar 18. As shown in FIG. 1, the electric motor 2 is integrally constituted with an EPS controller 3. The electric motor 2 is received within a motor housing 30 integrally formed with the input side housing 14 receiving the input shaft 9 and so on. The electric motor 2 includes a motor shaft (not shown) including a first axial end portion connected to the worm shaft 21 shown by an imaginary line in FIG. 2 and FIG. 3. The worm is integrally formed on the outer circumference of the worm shaft 21. The worm is engaged with the helical teeth portion 24 of the worm wheel 22.

A torque sensor 31 is provided around the outer circumference portion of the connection shaft 10 on the first end side of the annular protruding portion 10*c*, in a state in which the first torsion bar 18 penetrates through the inside of the annular torque sensor 31. The torque sensor 31 mainly includes a permanent magnet 32; a pair of first and second yokes 33 and 34; a pair of magnetism collecting rings 35 and 36; and a magnetic sensor 37. The permanent magnet 32, the yokes 33 and 34, and the magnetism collecting rings 35 and 36 are disposed to be substantially concentric with a rotation center line of the steering shaft 7.

The permanent magnet 32 is a magnetic member which is made from the magnetic material into a substantially cylindrical shape, and which is mounted and fixed on the outer circumference of the first end portion of the connection shaft 10. The permanent magnet 32 is constituted by the N poles and the S poles which are alternatingly disposed (magnetized) in the circumferential direction of the permanent magnet 32.

Each of the pair of yokes 33 and 34 are made from the soft magnetic material into a substantially cylindrical shape. The yokes 33 and 34 include, respectively, first end sides which are on the intermediate shaft 11 side, which are aligned in series with each other (in a line) along the circumferential direction, and which confront the permanent magnet 32 in the radial direction. On other than hand, the first yoke 33 is disposed on the inner circumference side. The second yoke 34 is disposed on the outer circumference side. With these, second end sides of the yokes 33 and 34 confront each other in the radial direction.

Each of the pair of the magnetism collecting rings 35 and 36 is a substantially annular ring configured to collect the magnetic flux of the permanent magnet 32 which is leaked on the second end sides of the yokes 33 and 34, to a predetermined range. The pair of the magnetism collecting rings 35 and 36 are disposed between the second end sides of the yokes 33 and 34 in the radial direction. The magnetism collecting ring 35 is disposed on the outer circumference side. The magnetism collecting ring 36 is disposed on the inner circumference side. The magnetism collecting rings 35 and 36 confront each other in the radial direction. A Hall element 38 is disposed between the magnetism collecting rings 35 and 36 in the radial direction. The magnetism collecting ring 35 includes a magnetism collecting portion 35*a* which is provided at a predetermined circumferential position of the magnetism collecting ring 35, and which is pressed on the radially inward side. On the other hand, the magnetism collecting ring 36 includes a magnetism collecting portion 36*a* which is provided at a circumferential position confronting the magnetism collecting portion 35*a*, and which protrudes in the radially outward direction.

The magnetic sensor 37 is constituted by the Hall element 38 received and disposed in a radial clearance between the magnetism collecting portion 35*a* and the magnetism collecting portion 35*b*; and a connection terminal 40 connecting this Hall element 38 to a control board 39 disposed above the torque sensor 31. The magnetic sensor 37 is configured to sense the magnetic flux passing between the magnetism collecting portions 35*a* and 36*a*, by the Hall element 38 by using the Hall effect by the Hall element 38, and to output the signal according to this magnetic flux, to the control board 39. With this, the calculation of the relative rotation angle between the input shaft 9 and the intermediate shaft 11, and the calculation of the steering torque based on this relative rotation angle are performed in the control board 39.

The housing 8 is constituted by an output side housing 41 which has a cylindrical shape having a first end side opened, and a second end side closed, and which defines the first and second fluid chambers P1 and P2; an intermediate housing 42 which is provided to close the first end opening portion of the output side housing 41, and which receives the rotary valve 29; and the above-described input side housing 14 which is connected with the intermediate housing 42, and which receives the input shaft 9, the connection shaft 10, a part of the intermediate shaft 11, and the torque sensor 31. As shown in FIG. 1, the output side housing 41 and the intermediate housing 42 are tightened with each other through a plurality of fixation means such as a bolt 43. On the other hand, the intermediate housing 42 and the input side housing 14 are tightened with each other through a plurality of fixation means such as screws 44.

A power cylinder main body portion 41*a* and a shaft receiving portion 41*b* are provided within the output side housing 41. The power cylinder main body portion 41*a* is formed along the axial direction of the steering shaft 7. The shaft receiving portion 41*b* is formed to be perpendicular to the power cylinder main body portion 41*a*. Moreover, a portion of the shaft receiving portion 41*b* confronts the power cylinder main body portion 41*a*. The piston 28 linked with the output shaft 12 is received within the power cylinder main body portion 41*a*, so that the first fluid chamber P1 on the first end side, and the second fluid chamber P2 on the second end side are defined by the piston 28. Moreover, the sector shaft 5 is received within the shaft receiving portion 41*b*. The sector shaft 5 includes a first axial end side linked with the piston 28; and a second axial end side linked through the pitman arm (not shown) to the steered wheels.

The piston 28 includes the rack teeth 28*a* formed on the outer circumference portion of the piston 28. The sector shaft 5 includes a sector gear 5*a* formed on the outer circumference portion of the sector shaft 5. The rack teeth 28*a* and the sector gear 5*a* are be engaged with each other. The sector shaft 5 is configured to be pivoted in accordance with the axial movement of the piston 28 by the engagement between the rack teeth 28*a* and the sector gear 5*a*. With this, the pitman arm are pulled in the widthwise direction of the vehicle body, so that the direction of the steered wheels are varied. Besides, in this case, the hydraulic fluid within the first fluid chamber P1 is introduced into the shaft receiving portion 41*b* to lubricate between the rack teeth 28*a* and the sector gear 5*a*.

As shown in FIG. 2, the intermediate housing 42 includes an axial insertion hole 42*a* which is formed on the inner circumference side of the intermediate housing 42, which receives the intermediate shaft 11 and the output shaft 12 that are overlapped with each other, and which penetrates in a stepped diameter decreasing shape from the first end side to the second end side in the axial direction. A bearing Bn is provided on a large diameter portion of the axial insertion hole 42*a* on the first end side. The bearing Bn rotatably supports the output shaft 12. On the other hand, the small diameter portion of the axial insertion hole 42*a* on the second end side includes an introduction port 45 connected with the pump device (not shown); a supply and discharge port 46 configured to supply and discharge the fluid pressure introduced from the introduction port 45 to and from the fluid chambers P1 and P2; and a discharge port 47 configured to discharge the hydraulic fluid discharged from the fluid chambers P1 and P2 through the supply and discharge port 46, to a reservoir tank (not shown). Besides, the supply and discharge port 46 is connected to the first fluid chamber P1 through a first supply and discharge passage L1 provided at the first end side diameter increasing portion of the output shaft 12. The supply and discharge port 46 is connected to the second fluid chamber P2 through a second supply and discharge passage L2 provided within the output side housing 41, and so on.

The second end portion section of the steering device including the intermediate housing 42, and the output side housing 41 are previously assembled. The second end section of the steering device is combined through the control shaft 10 with the first end section of the steering device which includes the input shaft 9, and which is previously assembled.

In the thus-constructed steering device, when the driver steers the steering wheel, the hydraulic fluid pressurized and supplied from the pump device is supplied through the rotary valve 29 to one of the fluid chambers P1 and P2 in accordance with the steering direction. The hydraulic fluid (the redundant amount) corresponding to the supply amount is discharged from the other of the fluid chambers P1 and P2 to the reservoir tank. With this, the piston 28 is driven by this hydraulic pressure, so that the assist torque based on the hydraulic pressure acted to the piston 28 is provided to the sector shaft 5.

Figure 4:
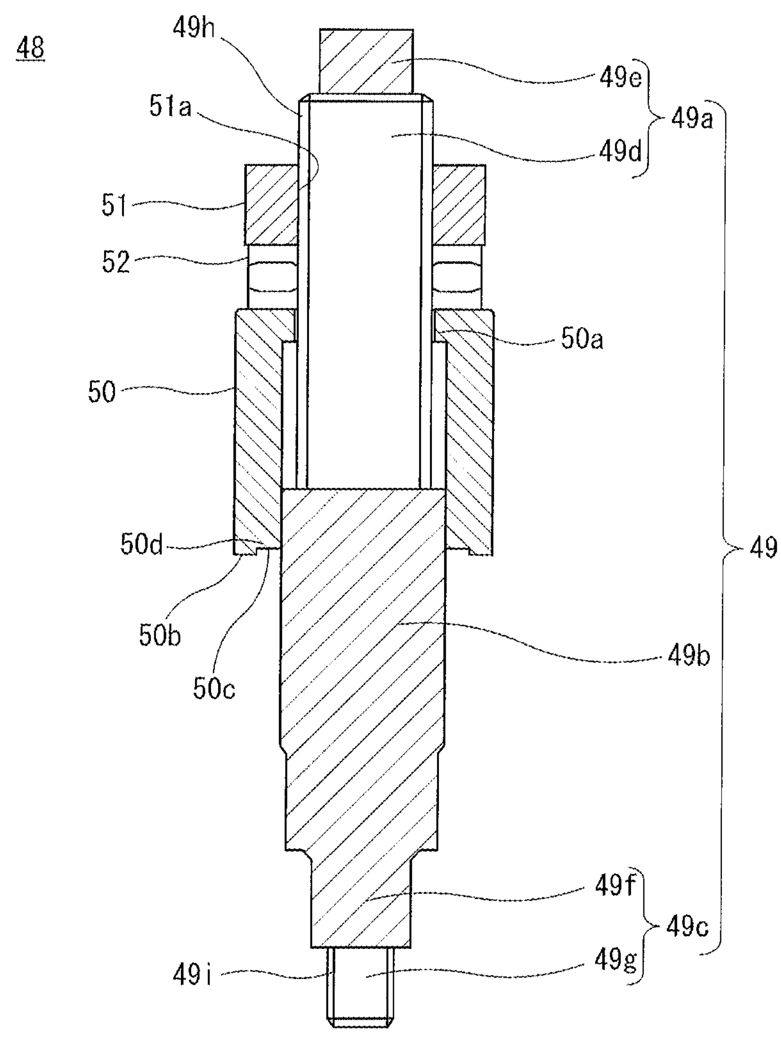
FIG. 4 is a sectional view of a first press fit device in the first embodiment.

FIG. 4 is a sectional view showing a first press fit device 48 which is used in a press fit method of the worm wheel 22 in the first embodiment.

The first press fit device 48 includes a fixed shaft portion 49 fixed to the intermediate shaft 11; a pressing portion 50 which is configured to be moved with respect to the fixed shaft portion 49 in the axial direction, and which serves for the pressing of the core metal portion 23 by the worm wheel 22; a nut 51 which is provided to the fixed shaft portion 49 through an external screw portion 49*h* (described later) and an internal screw portion 51*a* (described later), and which is a pressing force providing portion configured to provide a pressing force to the pressing portion 50 by a reaction force of the tightening of the internal screw portion 51*a* to the external screw portion 49*h*; and a thrust bearing 52 which is provided between the nut 51 and the pressing portion 50, and which is a friction decreasing portion configured to decrease the friction between the inner circumference surface of the pressing portion 50, and a center shaft portion 49*b* (described later) of the fixed shaft portion 49 at the pressing.

The fixed shaft portion 49 is made from the metal material into a cylindrical shape. The fixed shape portion 49 includes a first end side shaft portion 49*a* which has a cylindrical shape, and which is positioned on the first end side in the axial direction; a central shaft portion 49*b* which has a cylindrical shape, which is integrally formed with the first end side shaft portion 49*a*, and which has a diameter greater than a diameter of the first end side shaft portion 49*a*; and a second end side shaft portion 49*c* which has a cylindrical shape, which is integrally formed with the central shaft portion 49*b*, and which has a diameter smaller than the diameter of the central shaft portion 49*b*.

The outer circumference portion of the first end side shaft portion 49*a* includes a screw (threaded) portion 49*d* which includes an external screw portion 49*h* that is formed from the central shaft portion 49*b* to a portion near the first axial end, and that is engaged with the internal screw portion 51*a* provided on the inner circumference portion of the nut 51; and a non-screw (non-threaded) portion 49*e* which has a diameter smaller than a diameter of the screw portion 49*d*, which is integrally formed with the screw portion 49*d*, and which has no external screw portion.

The second end side shaft portion 49*c* has a stepped shape having the diameter decreased from the central shaft portion 49*b* toward the second end side in the axial direction. The second end side shaft portion 49*c* includes a large diameter cylindrical portion 49*f* which is adjacent to the central shaft portion 49*b* in the axial direction; and a small diameter cylindrical portion 49*g* which is integrally formed with the large diameter cylindrical portion 49*f*, and which has a diameter smaller than the diameter of the large diameter cylindrical portion 49*f*. The outer circumference portion of the small diameter cylindrical portion 49*g* includes an external screw portion 49*i* screwed in an internal screw portion 11*b* (described later) provided to the intermediate shaft 11.

The pressing portion 50 is made from the metal material into a cylindrical shape. The pressing portion 50 includes an annular protruding portion 50*a* which has an annular shape protruding on the first axial end side from an inner circumference surface in the radially inward direction. The annular protruding portion 50*a* has an inside diameter which is set to be slightly greater than a maximum outside diameter (an outside diameter of the screw thread) of the external screw portion 49*h* of the first end side shaft portion 49*a*. Moreover, an inside diameter of a portion of the pressing portion 50 which does not include the annular protruding portion 50*a* is set to correspond to the outside diameter of the central shaft portion 49*b*.

Moreover, the second axial end surface of the pressing portion 50 includes a pressing surface 50*b* configured to press the second axial end surface 23*a* of the core metal portion 23 at the press fit of the core metal portion 23 into the intermediate shaft 11; and an abutment surface 50*c* abutted on the first axial end surface 11*a* of the intermediate shaft 11 at the end of the press fit of the core metal 23. The pressing surface 50*b* is an annular surface positioned radially outside the pressing portion 50. The abutment surface 50*c* is an annular surface which is positioned radially inside the pressing portion 50, and which is disposed to be offset to the first axial end side from the pressing surface 50*b* through the stepped portion 50*d*.

Figure 5:
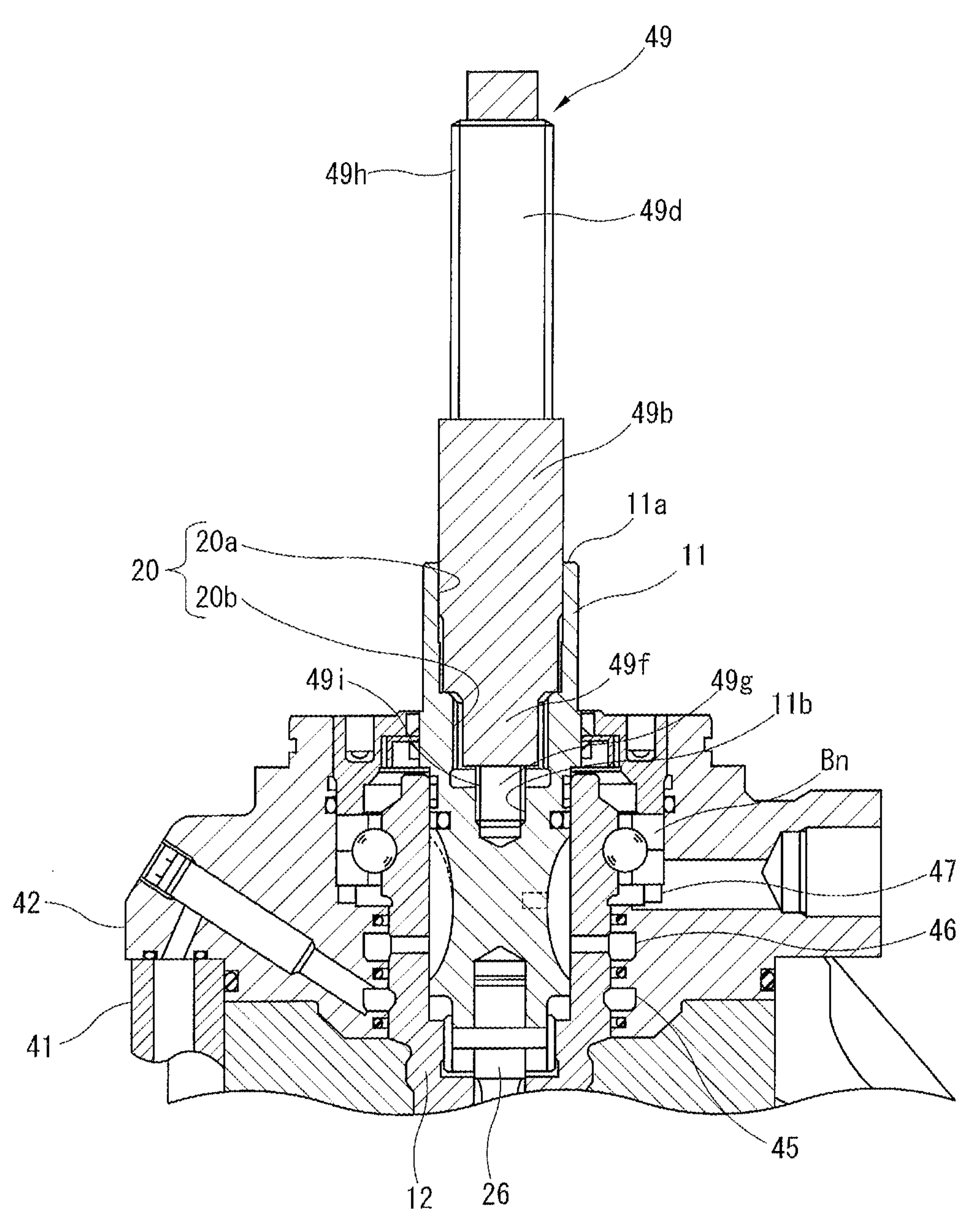
FIG. 5 is a process view showing a fixation process of a fixed shaft portion in the first embodiment.
Figure 6:
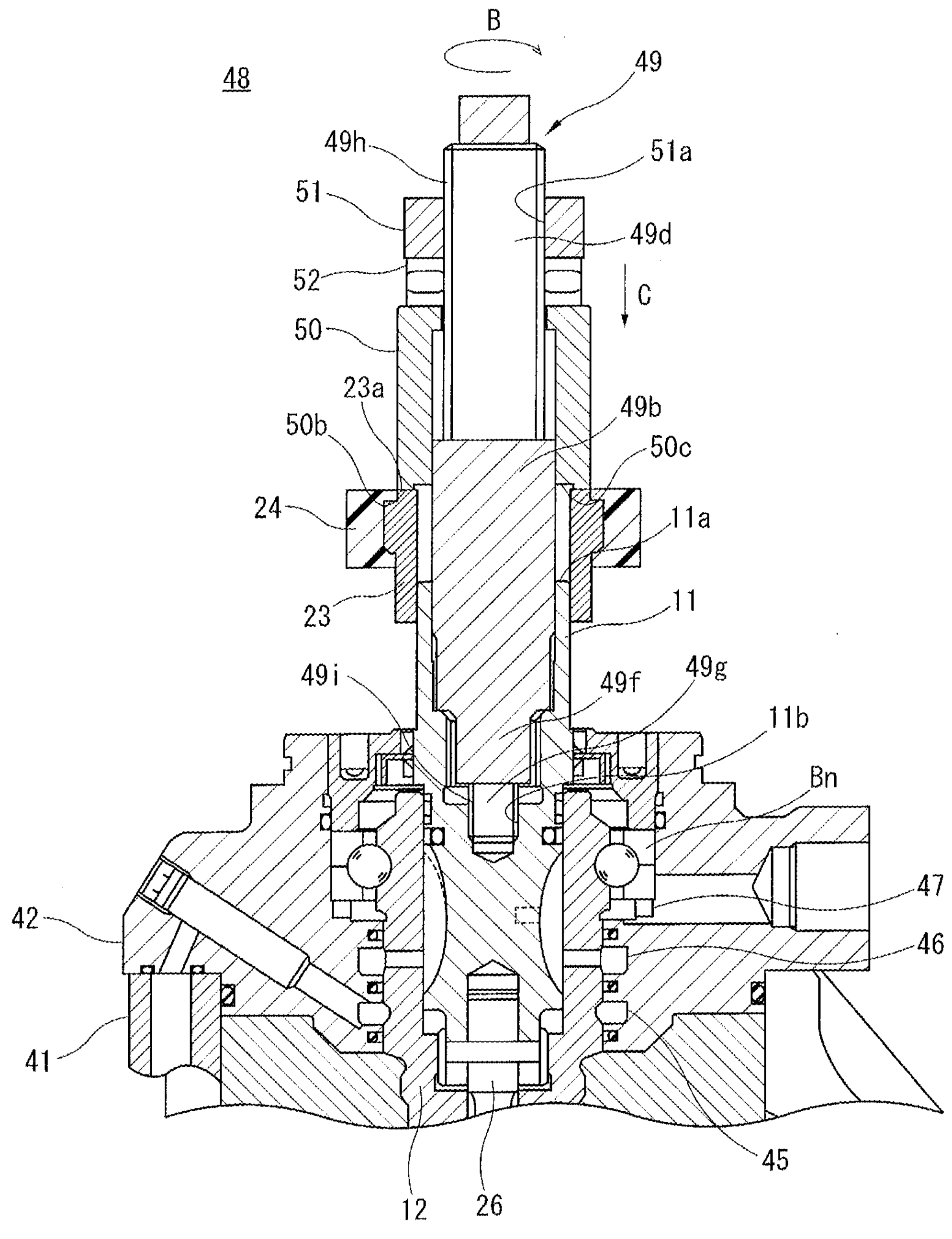
FIG. 6 is a process view showing a press fit process of a worm wheel in the first embodiment.
Figure 7:
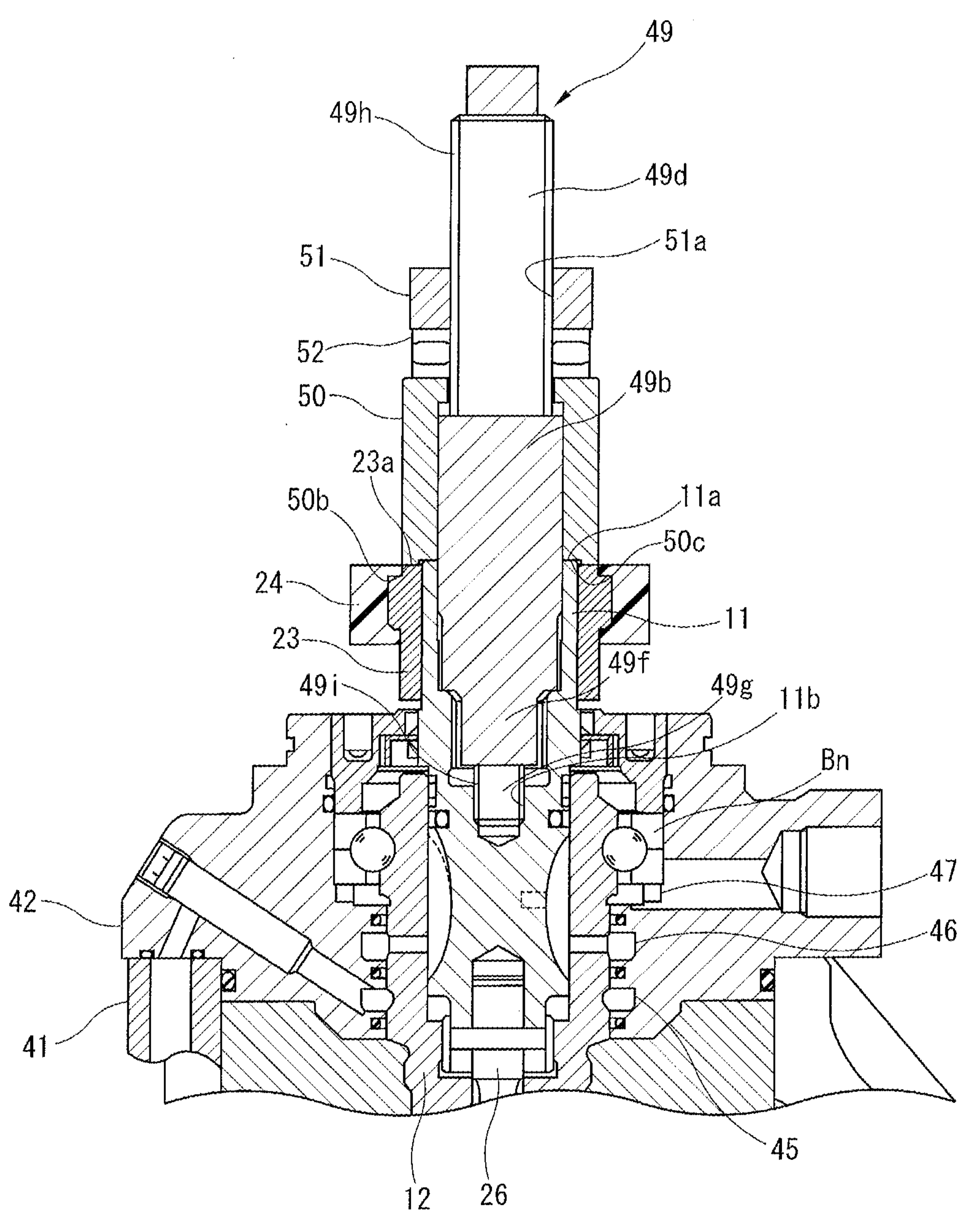
FIG. 7 is an explanation view showing the worm wheel in a state in which the worm wheel is press fit on an intermediate shaft.

FIG. 5 is a process view showing a fixation process of the fixed shaft portion 49 in the plurality of the processes of the press fit method of the worm wheel 22 in the first embodiment. FIG. 6 is a process view showing a press fit process of the worm wheel 22 in the plurality of the processes of the press fit method of the worm wheel 22 in the first embodiment. FIG. 7 is an explanation view showing the worm wheel 22 on a state in which the worm wheel 22 is press fit in the intermediate shaft 11.

Firstly, the portion of the second end side of the steering device which includes the intermediate shaft 11 and the output shaft 12 is disposed so that the receiving recessed portion 20 of the intermediate shaft 11 directs in the upward direction, as shown in FIG. 5.

Then, the internal screw portion 11*b* is previously formed at the bottom portion of the small diameter recessed portion 20*b* of the intermediate shaft 11, by using a screw forming tool (not shown) such as a threading tap, as shown in FIG. 5. The internal screw portion 11*b* is engaged with the external screw portion 49*i* of the small diameter cylindrical portion 49*g* of the fixed shaft portion 49.

Next, in the fixation process of the fixed shaft portion 49 shown in FIG. 5, the external screw portion 49*i* of the small diameter cylindrical portion 49*g* is screwed into the internal screw portion 11*b* of the intermediate shaft 11. With this, the fixed shaft portion 49 is fixed to the intermediate shaft 11. As shown in FIG. 5, in a state in which the fixed shaft portion 49 is fixed to the intermediate shaft 11, a portion of the central shaft portion 49*b* of the fixed shaft portion 49 on the second axial end side is disposed within the receiving recessed portion 20 of the intermediate shaft 11.

Then, in the press fit process of the worm wheel 22 shown in FIG. 6, the worm wheel 22 is disposed around the first axial end portion of the central shaft portion 49*b* of the fixed shaft portion 49. The pressing portion 50 is disposed from the first axial end side of the fixed shaft portion 49 so that the pressing surface 50*b* of the pressing portion 50 is abutted on the axial end surface 23*a* of the core metal portion 23 of the worm wheel 22. After the disposition of the pressing portion 50, as shown in FIG. 6, the thrust bearing 52 is disposed to be adjacent to the first axial end portion of the pressing portion 50 in the axial direction. After the disposition of the thrust bearing 52, as shown in FIG. 6, the nut 51 is disposed to be adjacent to the first axial end portion of the thrust bearing 52 in the axial direction.

Then, as shown in FIG. 6, the nut 51 is rotated in a direction shown by an arrow B. With this, the internal screw portion 51*a* of the nut 51 is screwed on the second end side along the direction shown by an arrow C with respect to the external screw portion 49*h* of the first axial end portion 49*a* which is fixed. With this, the reaction force by this screw (thread) is transmitted through the thrust bearing 52 to the pressing portion 50. The pressing portion 50 presses the core metal portion 23 in the arrow C direction while the inner circumference surface of the pressing portion 50 is slidably moved on the outer circumference surface of the central shaft portion 49*b*. With this, the inner circumference portion of the core metal portion 23 is press fit on the outer circumference portion of the intermediate shaft 11. As shown in FIG. 7, in a state in which the core metal 23 is press fit on the outer circumference portion of the intermediate shaft 11, the abutment surface 50*c* of the pressing portion 50 is abutted on the first axial end surface 11*a* of the intermediate shaft 11. Moreover, the axial end surface 23*a* of the core metal portion 23 is positioned slightly on the second end side of the first axial end surface 11*a* of the intermediate shaft 11.

Effects of First Embodiment

In the first embodiment, the core metal portion 23 of the worm wheel 22 constituting the speed reduction device 19 is connected to the outer circumference portion of the intermediate shaft 11. The electric motor 2 is configured to provide the rotation force through the speed reduction device 19 to the intermediate shaft 11. In a case in which the core metal portion 23 is connected to the outer circumference portion of the connection shaft 10, the rotation force from the electric motor 2 is transmitted through the spline portion 13 between the connection shaft 10 and the intermediate shaft 11, to the intermediate shaft 11. With this, the rotation force from the electric motor 2 is transmitted to the intermediate shaft 11 with the deterioration of the response due to the backlash of the spline portion 13. Accordingly, in the first embodiment, the rotation force of the electric motor 2 is directly transmitted to the intermediate shaft 11 without passing through the connection shaft 10. Therefore, it is possible to improve the response of the rotation force from the electric motor 2 with respect to the intermediate shaft 11, without the deterioration of the response due to the backlash.

Besides, in the known art, a hollow motor is provided to the outer circumference portion of the intermediate shaft 11 so as to directly provide the rotation force to the intermediate shaft. However, this hollow motor has a relatively large size. Accordingly, the radial size of the housing receiving the hollow motor around the intermediate shaft 11 is increased.

However, in this embodiment, the rotation force of the electric motor 2 provided outside the intermediate shaft 11 is amplified by the speed reduction device 19. With this, it is possible to decrease the radial size of the input side housing 14 receiving the intermediate shaft 11 and so on.

Moreover, in the first embodiment, the core metal portion 23 of the worm wheel 22 is fit on the outer circumference portion of the intermediate shaft 11 by using the first press fit device 48. At this press fit, the external screw portion 49*i* of the small diameter cylindrical portion 49*g* of the fixed shaft portion 49 is screwed into the internal screw portion 11*b* formed near a central portion of a bottom portion of the small diameter recessed portion 20*b* of the intermediate shaft 11. With this, the fixed shaft portion 49 is fixed to the intermediate portion 11. The worm wheel 22, the pressing portion 50, the thrust bearing 52, and the nut 51 are disposed in this order from the first axial end side of the fixed shaft portion 49. Then, the nut 51 is rotated in the arrow B direction. With this, the core metal portion 23 is press fit on the outer circumference portion of the intermediate shaft 11 while the pressing portion 50 is slidably moved on the outer circumference portion of the central shaft portion 49*b* of the fixed shaft portion 49. In this way, the core metal portion 23 is press fit while the pressing portion 50 is slidably moved on the outer circumference portion of the central shaft portion 49*b*. With this, it is possible to decrease the thrust force acted to the intermediate shaft 11, and to suppress the damage of the second torsion bar 26 connected to the intermediate shaft 11, relative to a case in which the pressing force is directly acted to the core metal portion 23 without using the fixed shaft portion 49.

Besides, it is supposed that the electric motor 2 in this embodiment is configured to provide the extremely large rotation force relative to the hollow motor of the above-described known art. Similarly, the rotation force transmitted through the speed reduction device 19 to the intermediate shaft 11 becomes large. Accordingly, the extremely large press fit force is needed at the press fit of the core metal portion 23 on the outer circumference portion of the intermediate shaft 11, relative to a case in which the hollow motor is press fit on the outer circumference portion of the intermediate shaft, so as to withstand (resist) the large rotation force. Therefore, in this embodiment, it is particularly important to decrease the thrust force acted to the intermediate shaft 11, and thereby to suppress the damage of the second torsion bar 26.

Moreover, in the first embodiment, the internal screw portion 11*b* is formed near the bottom portion of the small diameter recessed portion 20*b* which is apart from the first axial end surface 11*a* of the intermediate shaft 11 toward the second end side by the relatively long distance. Accordingly, it is possible to improve the freedom of the design by which the spigot of the fixed shaft portion 49 can be sufficiently ensured within the receiving recessed portion 20 of the intermediate shaft 11, relative to a case in which the internal screw portion 11*b* is formed near the first axial end surface 11*a*.

Furthermore, in the first embodiment, the input shaft 9 and the intermediate shaft 11 are connected with each other through the first torsion bar 18, and the cylindrical connection shaft 10 provided around the first torsion bar 18. The connection shaft 10 separates the input side steering device section of the steering device which includes the input shaft 9, the torque sensor 31, and the electric motor 2, and the output side portion section of the steering device including the intermediate shaft 11, the output shaft 12, the power cylinder 6, and so on. Accordingly, the input side steering device section previously assembled is disposed and fixed through the connection shaft 10 to the output side section of the steering device which is previously assembled. With this, it is possible to readily manufacture the steering device. Conversely, in a case in which the connection shaft 10 is not provided to the steering device, the assembling operation from the input side section to the output side section is needed to be performed by a series of the operations. Consequently, the relatively long time period is needed for the manufacturing of the steering device. Moreover, at the maintenance of the steering device, it is possible to readily access the insides of the input side section and the output side section merely by detaching the input side portion from the output side portion of the steering device, and to perform the maintenance, relative to the steering device which does not have the connection shaft 10.

Moreover, in the conventional art, the ball bearings are provided at two portions of the first end side outer circumference portion and the second end side outer circumference portion of the intermediate shaft portion. With this, the intermediate shaft is rotatably supported on the housing.

However, in this first embodiment, the outer circumference portion of the first end side of the connection shaft 10 is rotatably supported by the ball bearing Bb1. On the other hand, the portion of the connection shaft 10 on the second end side is inserted into the receiving recessed portion 20 of the intermediate shaft 11. Accordingly, in this embodiment, the portion of the connection shaft 10 on the second end side is inserted into the receiving recessed portion 20 by the larger amount relative to the portion of the connection shaft on the second end side in the conventional art. Therefore, it is possible to suppress the falling of the connection shaft 10 with respect to the intermediate shaft 11.

Furthermore, in this embodiment, it is unnecessary to provide the ball bearing provided to the outer circumference portion of the second end side of the connection shaft 10, unlike the conventional art. Accordingly, it is possible to decrease the manufacturing cost of the steering device.

Second Embodiment

Figure 8:
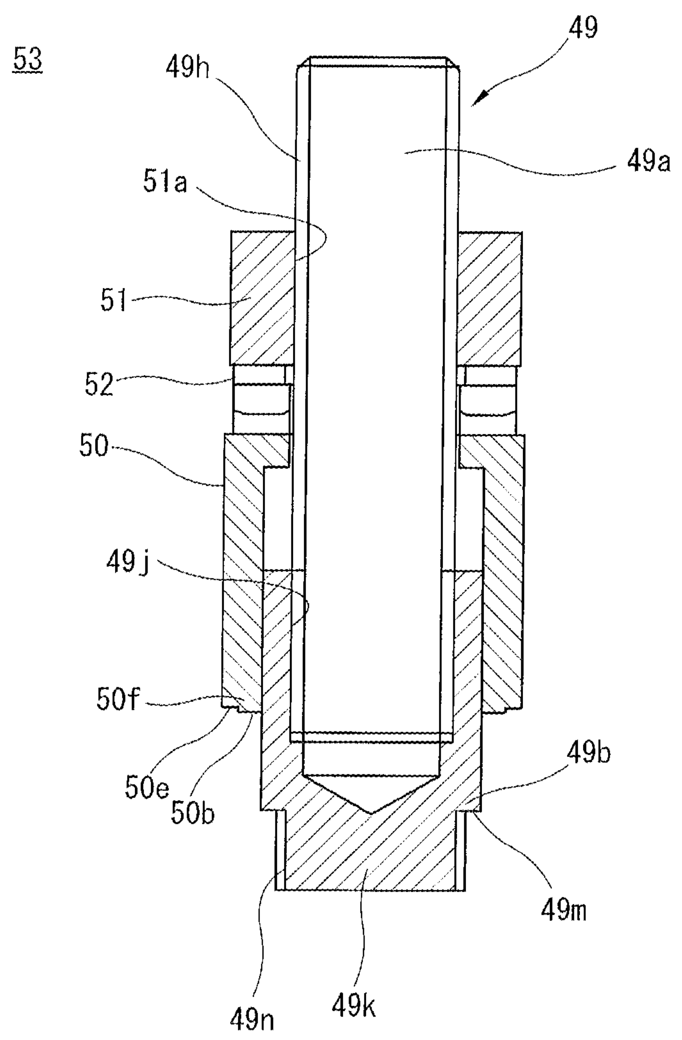
FIG. 8 is a sectional view showing a second press fit device according to a second embodiment.

FIG. 8 is a sectional view of a second press fit device 53 used in the press fit method of the worm wheel 22 according to a second embodiment.

In the second embodiment, the fixed shaft portion 49 of the second press fit device 53 is constituted by jointing the first end side shaft portion 49*a* and the central shaft portion 49*b* by a screw. Moreover, a shape of the second axial end portion of the pressing portion 50 of the second press fit device 53 according to the second embodiment is different from the shape of the second axial end portion of the pressing portion 50 of the first press fit device 48 according to the first embodiment.

The outer circumference portion of the first axial end side shaft portion 49*a* includes an external screw portion 49*h* formed from the first axial end to the second axial end. The portion of the external screw portion 49*h* on the second axial end side is screwed in an internal screw portion 49*j* formed on the first axial end portion of the central shaft portion 49*b*. With this, the portion of the external screw portion 49*h* on the second axial end side is fixed to the central shaft portion 49*b*.

The central shaft portion 49*b* has an axial length shorter than an axial length of the central shaft portion 49*b* according to the first embodiment. Moreover, the central shaft portion 49*b* has an outside diameter substantially identical to the outside diameter of the intermediate shaft 11. As shown in FIG. 8, the central shaft portion 49*b* includes a small diameter cylindrical shaft portion 49*k* located on the second axial end side. An outer circumference portion of the small diameter cylindrical shaft portion 49*k* includes an external screw portion 49*n* screwed in the internal screw portion 11*c* (described later) provided to the intermediate portion 11. The central shaft portion 49*b* includes an annular surface 49*m* positioned at a base portion of the small diameter cylindrical shaft portion 49*k*. The annular surface 49*m* is abutted on the first axial end surface 11*a* of the intermediate shaft 11 in a state in which the fixed shaft portion 49 is fixed to the intermediate shaft 11 in the fixation process of the fixed shaft portion 49 (described later).

The second axial end surface of the pressing portion 50 includes the pressing surface 50*b* configured to press the axial end surface 23*a* of the core metal portion 23 at the press fit of the core metal 23 to the intermediate shaft 11; and a non-pressing surface 50*e* which does not press the axial end surface 23*a* of the core metal portion 23 at the press fit of the core metal 23 to the intermediate shaft 11. The pressing surface 50*b* is an annular surface positioned radially inside the pressing surface 50. The non-pressing surface 50 is an annular surface which is positioned radially outside the pressing portion 50, and which is disposed to be offset on the first axial end side from the pressing surface 50*b* through the stepped portion 50*f*.

Figure 9:
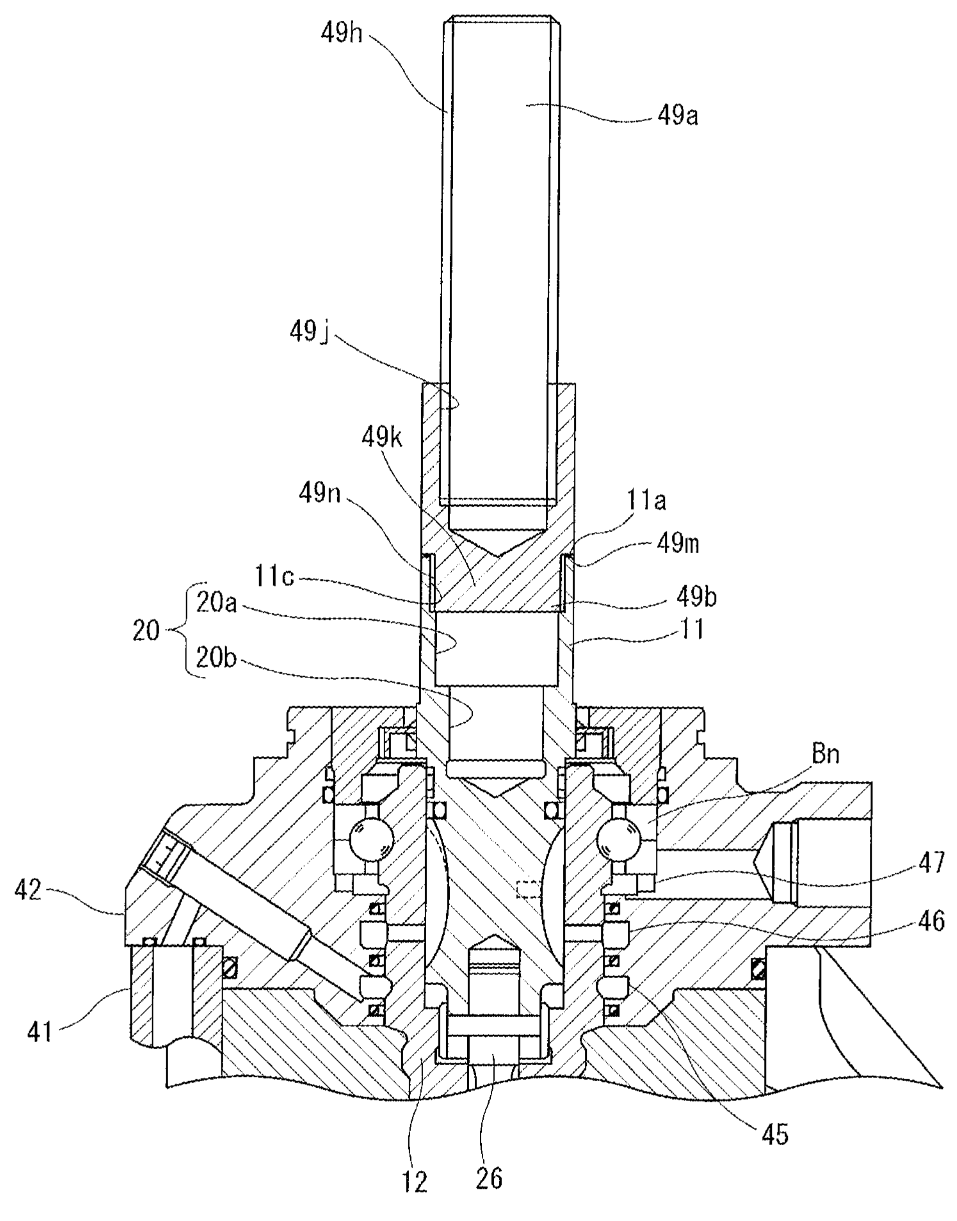
FIG. 9 is a process view showing a fixation process of a fixed shaft portion in the second embodiment.
Figure 10:
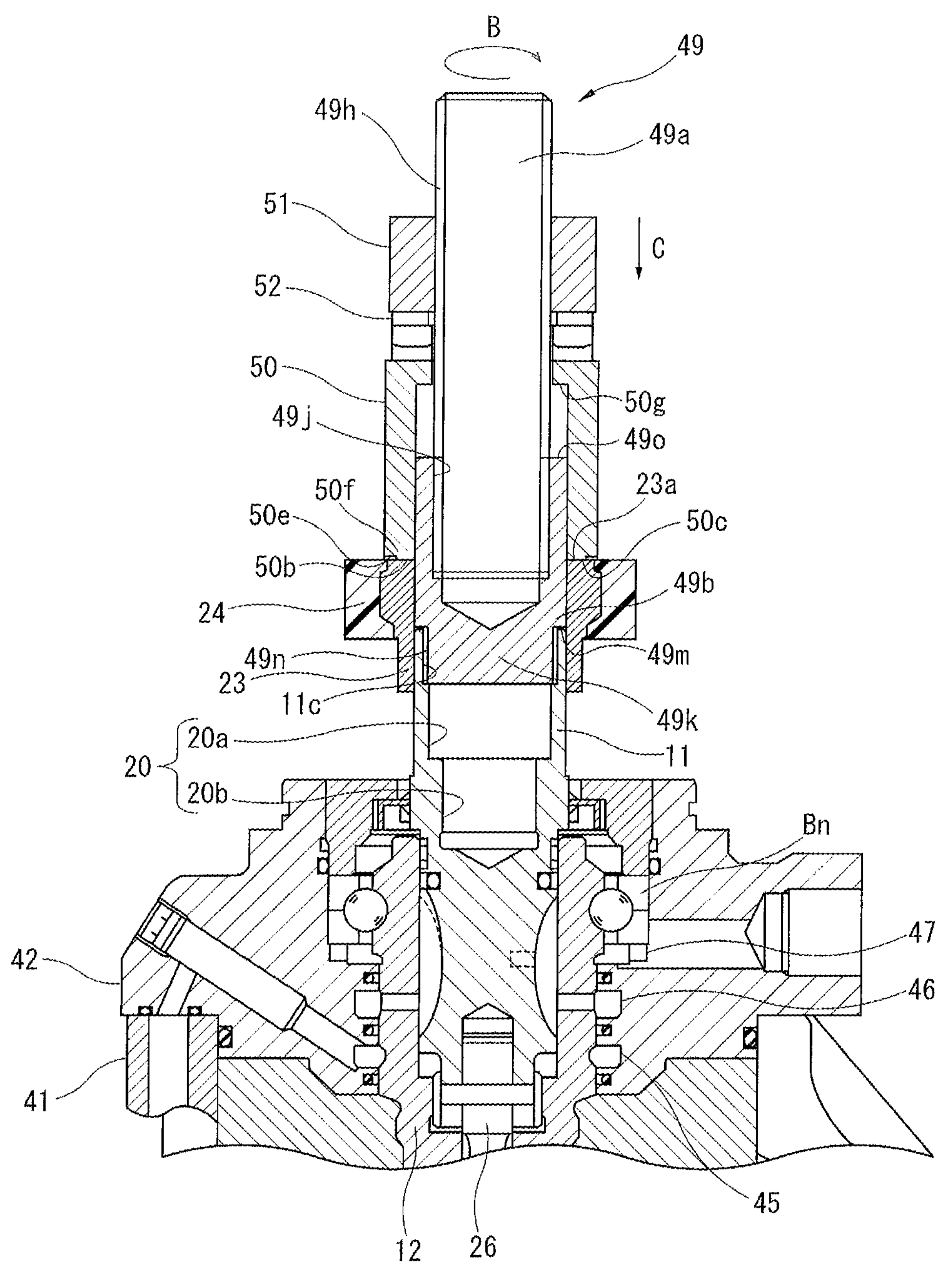
FIG. 10 is a process view showing a press fit process in the second embodiment.
Figure 11:
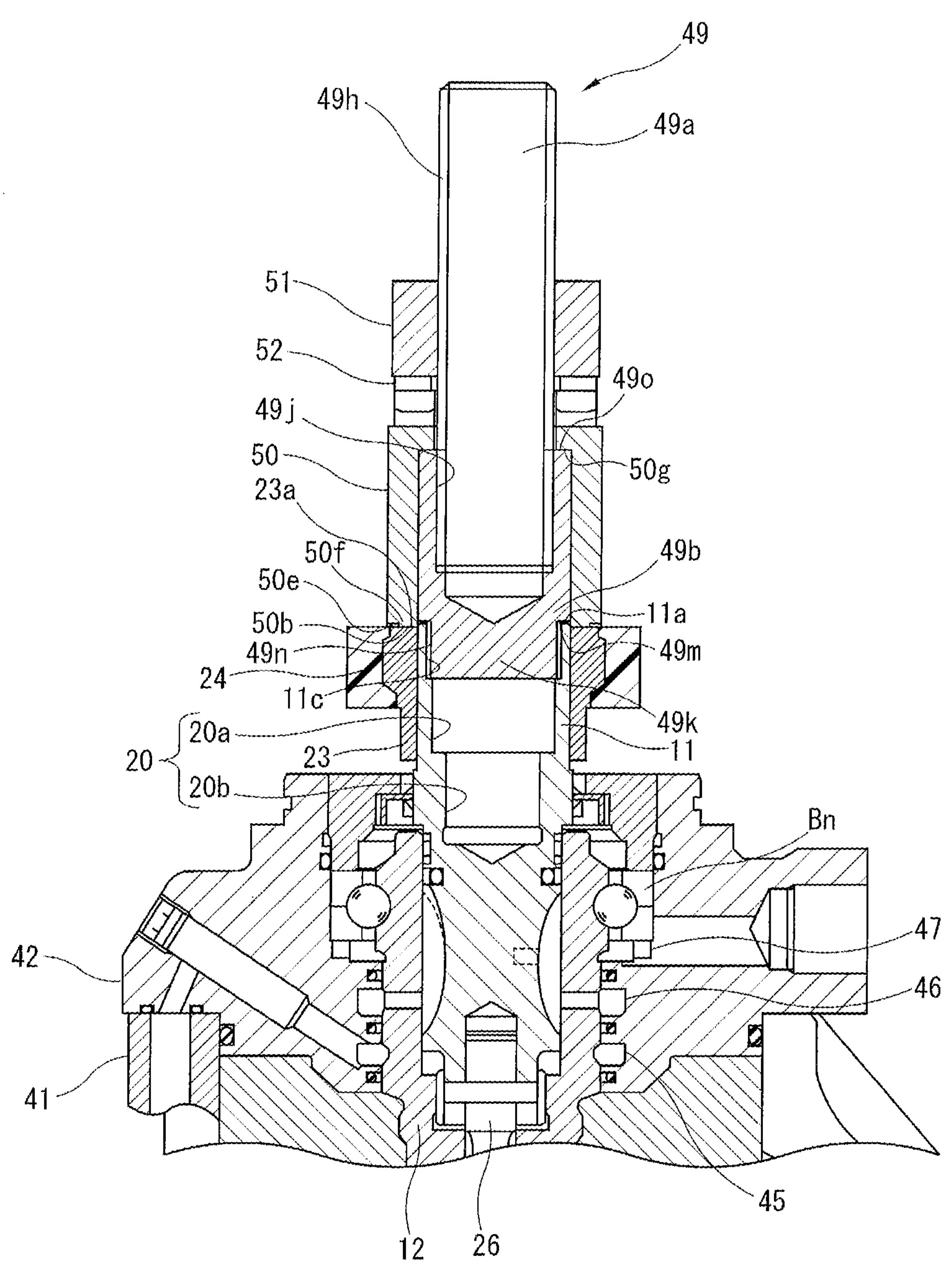
FIG. 11 is an explanation view showing the worm wheel in a state in which the worm wheel is press fit on the intermediate shaft in the second embodiment.

FIG. 9 is a process view showing the fixation process of the fixed shaft portion 49 in the plurality of the processes in the press fit method of the worm wheel 22 in the second embodiment. FIG. 10 is a process view showing the press fit process of the worm wheel 22 in the plurality of the processes in the press fit method of the worm wheel 22 in the second embodiment. FIG. 11 is an explanation view showing the worm wheel 22 which is press fit on the intermediate shaft 11.

Firstly, as shown in FIG. 9, the second end side portion of the steering device including the intermediate shaft 11 and the output shaft 12 is disposed so that the receiving recessed portion 20 of the intermediate shaft 11 is directed in the upward direction.

Then, the internal screw portion 11*c* is previously formed on the inner circumference surface of the first end portion of the intermediate shaft 11 by using a screw forming tool (not shown) such as a threading tap, as shown in FIG. 9. The internal screw portion 11*c* is engaged with the external screw portion 49*n* of the small diameter cylindrical shaft portion 49*k* of the fixed shaft portion 49.

Next, in the fixation process of the fixed shaft portion 49 shown in FIG. 9, the external screw portion 49*n* of the small diameter cylindrical shaft portion 49*k* is screwed into the internal screw portion 11*c* of the intermediate shaft 11, so that the fixed shaft portion 49 is fixed to the intermediate shaft 11. In a state in which the fixed shaft portion 49 is fixed to the intermediate shaft 11 as shown in FIG. 9, the small diameter cylindrical shaft portion 49*k* of the fixed shaft portion 49 is disposed within the large diameter recessed portion 20*a* of the receiving recessed portion 20 of the intermediate shaft 11, so that the annular surface 49*m* of the central shaft portion 49*b* is abutted on the first axial end surface 11*a* of the intermediate shaft 11.

Then, in the press fit process of the worm wheel 22 shown in FIG. 10, the worm wheel 22, the pressing portion 50, the thrust bearing 52, and the nut 51 are disposed in this order from the first axial end side of the fixed shaft portion 49, similarly to the press fit process according to the first embodiment.

Then, as shown in FIG. 10, similarly to the first embodiment, the nut 51 is screwed in the arrow B direction so that the pressing portion 50 is moved through the thrust bearing 52 in the arrow C direction. With this, the inner circumference portion of the core metal portion 23 is press fit on the outer circumference portion of the intermediate shaft 11. In a state in which the core metal 23 is press fit on the outer circumference portion of the intermediate shaft 11 as shown in FIG. 11, the axial end surface 23*a* of the core metal portion 23 is positioned slightly on the second end side of the first axial end surface 11*a* of the intermediate shaft 11. The annular surface 50*g* on the second axial end side of the annular protruding portion 50*a* of the pressing portion 50 is abutted on an annular confronting surface 49*o* provided at the first axial end of the central shaft portion 49*b*.

Effects of Second Embodiment

In the second embodiment, the external screw portion 49*n* of the small diameter cylindrical shaft portion 49*k* of the fixed shaft portion 49 is screwed in the internal screw portion 11*c* formed near the first axial end surface 11*a* of the intermediate shaft 11. Accordingly, the axial length of the fixed shaft portion 49 becomes shorter relative to a case in which the internal screw portion 11*b* is formed near the center of the bottom portion of the small diameter recessed portion 20*b* of the intermediate shaft 11 like the first embodiment. Therefore, it is possible to decrease the manufacturing cost of the fixed shaft portion 49.

Moreover, the internal screw portion 11*c* formed near the first axial end surface 11*a*, that is, the internal screw portion 11*c* formed on the inner circumference surface of the large diameter recessed portion 20*a* of the receiving recessed portion 20 has an outside diameter greater than an outside diameter of the internal screw portion 11*b* at the center of the small diameter recessed portion 20*b* according to the first embodiment. Accordingly, the area which is engaged with the external screw portion 49*n* is largely ensured. Therefore, the internal screw portion 11*c* according to the second embodiment can increase the fixation force with respect to the fixed shaft portion 49, relative to the internal screw portion 11*b* according to the first embodiment.

Third Embodiment

Figure 12:
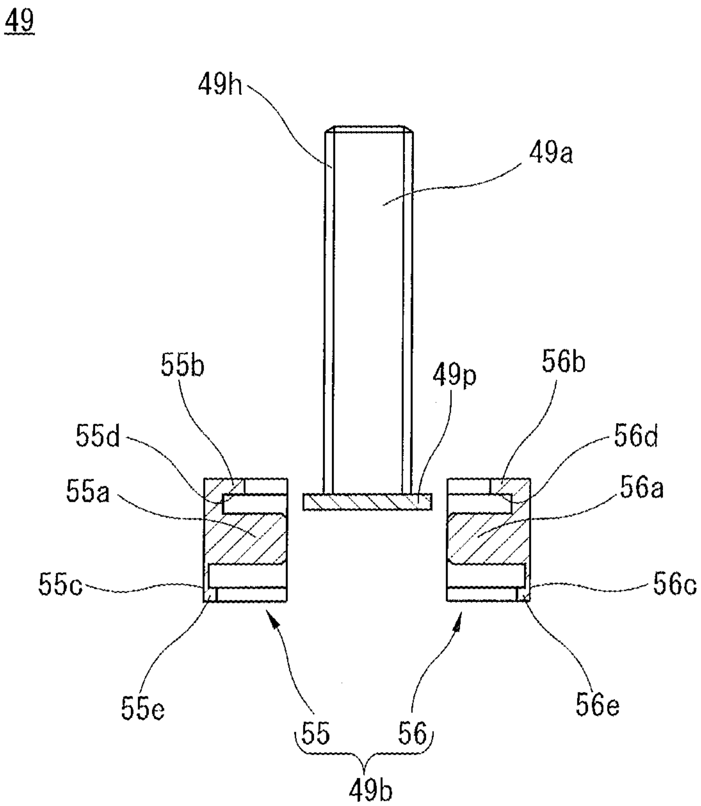
FIG. 12 is a sectional view showing a fixed shaft portion of a third press fit device according to a third embodiment.

FIG. 12 is a sectional view showing the fixed shaft portion 49 of the third press fit device 54 used in the press fit method of the worm wheel 22 in the third embodiment.

In the third embodiment, the fixed shaft portion 49 is not constituted by the connection between the first end side shaft portion 49*a* and the intermediate shaft portion 49*b* by the screw like the second embodiment. The fixed shaft portion 49 is constituted by sandwiching the second axial end portion of the first end side shaft portion 49*a* by the intermediate shaft portion 49*b* having a half divided shape.

The first end side shaft portion 49*a* includes an annular protruding portion 49*p* which has an annular shape, and which protrudes from the outer circumference portion of the second axial end in the radially outward direction.

The intermediate shaft portion 49*b* includes a first half portion 55 and a second half portion 56 which are formed by dividing a circular plate member having a relatively large thickness, into a two portion in the radial direction.

The first half portion 55 includes a first plate portion 55*a* which has a semicircular shape constituting a circular plate shape with the semicircular second plate portion 56*a* of the second half portion 56; a first first end side protruding portion 55*b* which protrudes from the outer circumference portion of the first plate portion 55*a* toward the first axial end side, and which constitutes the annular portion with a semicircular second first end side protruding portion 56*b* of the second half portion 56; and a first second end side protruding portion 55*c* which protrudes from the outer circumference portion of the first plate portion 55*a* toward the second axial end side, and which constitutes the annular portion with a semicircular second second end side protruding portion 56*c* of the second half portion.

The inner circumference surface of the first first end side protruding portion 55*b* includes a first semi-annular groove 55*d* which has a semi-annular shape that is continuous in the circumferential direction. This first semi-annular groove 55*d* forms an annular groove with a second semi-annular groove 56*d* provided at the second first end side protruding portion 56*b* of the second half portion 56. The annular protruding portion 49*p* of the first end side shaft portion 49*a* is mounted in this annular groove.

The first second end side protruding portion 55*c* includes a first protruding portion 55*e* which has a semi-circular shape, and which protrudes from the second axial end portion in the radially inward direction. The first protruding portion 55*e* forms an annular protruding portion with the second protruding portion 56*e* of the second half portion 56 which has a semicircular shape. This annular protruding portion is mounted in an annular recessed portion 11*d* (described later) which is formed on the outer circumference surface of the intermediate shaft 11.

The second half portion 56 includes a second plate portion 56*a*, a second first end side protruding portion 56*b*, a second second end protruding portion 56*c*, a second semi-annular groove 56*d*, and a second protruding portion 56*e* which have shapes identical to those of the first plate portion 55*a*, the first first end side protruding portion 55*b*, the first second end side protruding portion 55*c*, the first semi-annular groove 55*d*, and the first protruding portion 55*e*.

Figure 13:
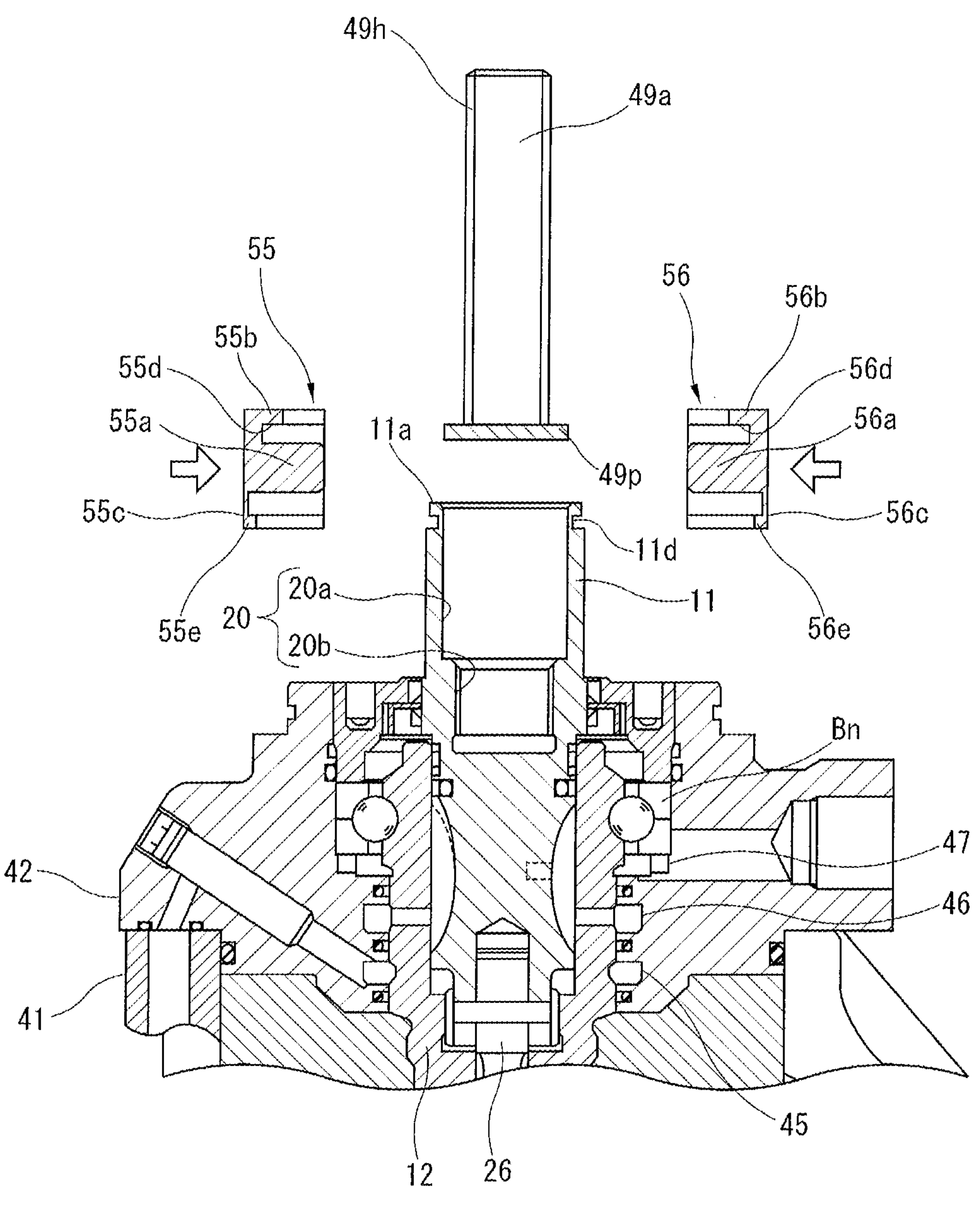
FIG. 13 is a process view showing a fixation process of the fixed shaft portion according to the third embodiment.
Figure 14:
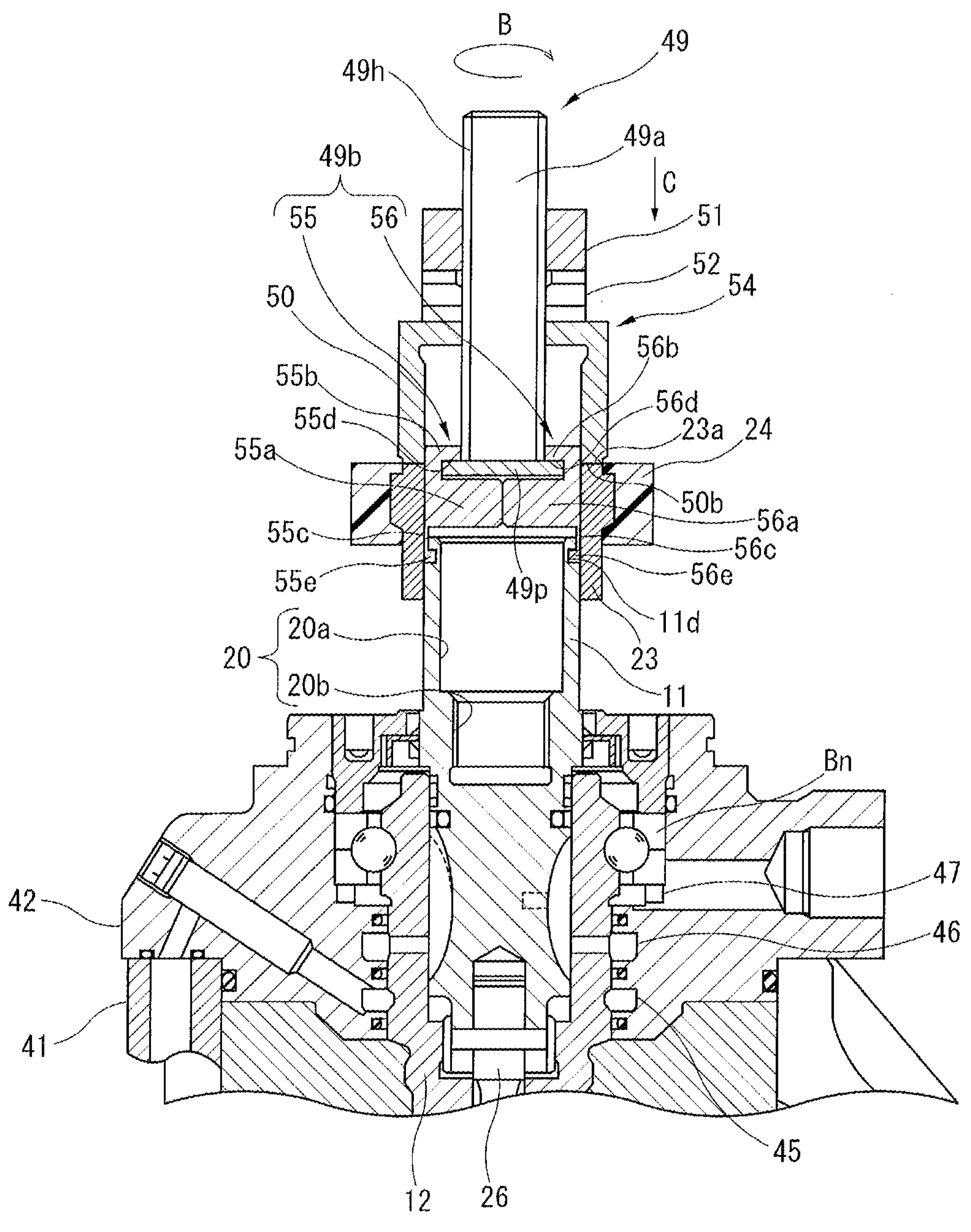
FIG. 14 is a process view showing the fixation process of the fixed shaft portion in the third embodiment.
Figure 15:
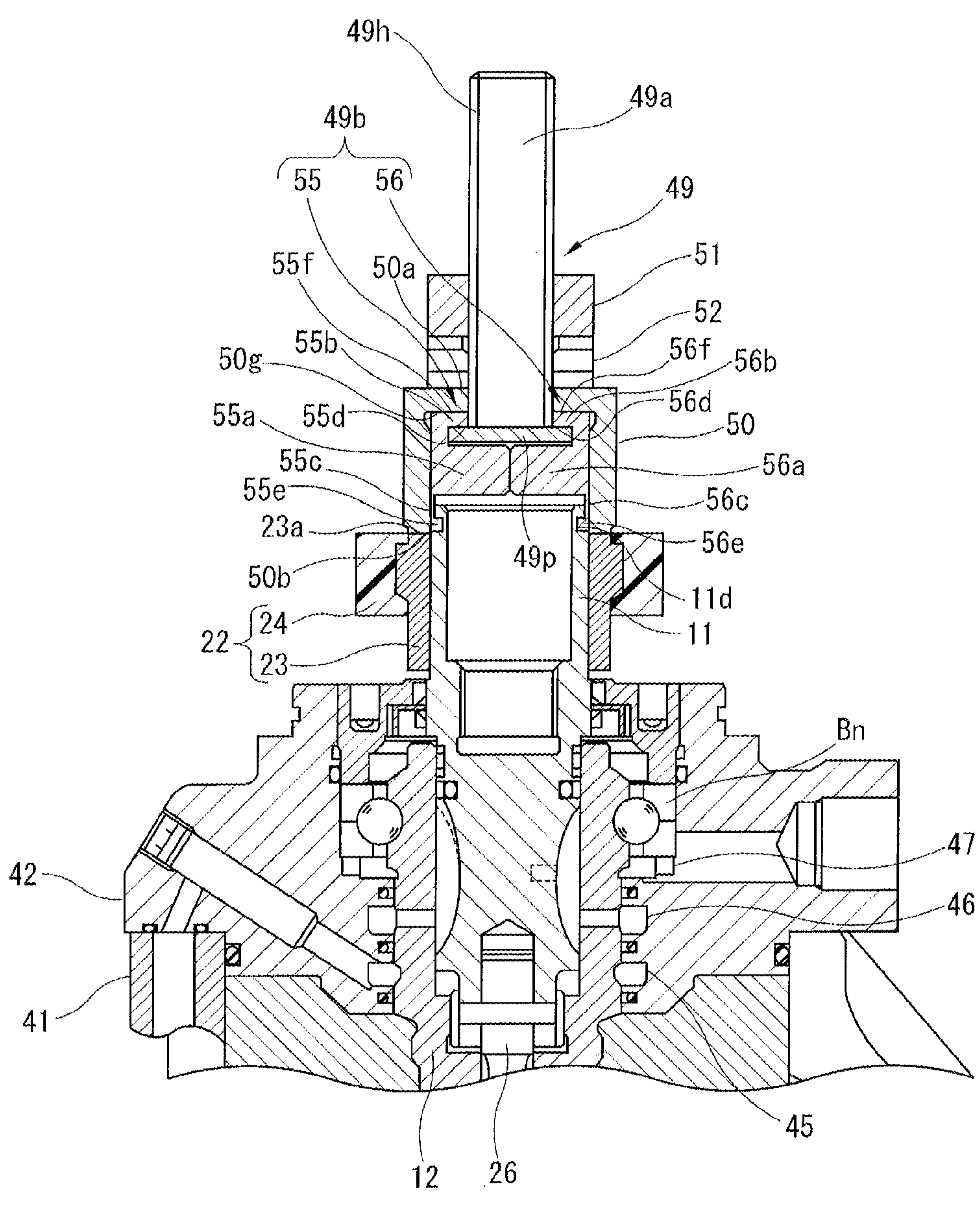
FIG. 15 is an explanation view showing the worm wheel in a state in which the worm wheel is press fit in the intermediate shaft in the third embodiment.

FIG. 13 is a process view showing the fixation process of the fixed shaft portion 49 in the plurality of the processes of the press fit method of the worm wheel 22 in the third embodiment. FIG. 14 is a process view showing the press fit process of the worm wheel 22 in the plurality of the processes of the press fit method of the worm wheel 22 in the third embodiment. FIG. 15 is an explanation view showing the worm wheel 22 in a state in which the worm wheel 22 is press fit on the intermediate shaft 11.

Firstly, as shown in FIG. 13, the portion of the steering device including the intermediate shaft 11 and the output shaft 12 is disposed so that the receiving recessed portion 20 of the intermediate shaft 11 is directed in the upward direction.

Then, as shown in FIG. 13, the annular recessed portion 11*d* is previously formed on the outer circumference of the first end portion of the intermediate shaft 11 by the machining. The annular recessed portion 11*d* is continuous in the circumferential direction.

Next, in the fixation process of the fixed shaft portion 49 shown in FIG. 13, the first end side shaft portion 49*a* is disposed at a position apart from the first axial end surface 11*a* of the intermediate shaft 11 to the first end side by a predetermined distance. After the disposition of the first end side shaft portion 49, the first half portion 55 and the second half portion 56 are moved from the radially outer side toward the radially inner side as shown in FIG. 13 so as to be abutted on each other. As shown in FIG. 14, in a state in which the first and second half portions 55 and 56 are abutted on each other, the first protruding portion 55*e* and the second protruding portion 56*e* which constitute the annular protruding portion are mounted in the annular recessed portion 11*d* of the intermediate shaft 11. Simultaneously, the annular protruding portion 49*p* of the first end side shaft portion 49*a* is mounted in the annular groove constituted by the first semi-annular groove 55*d* and the second semi-annular groove 56*d*.

Then, in the press fit process of the worm wheel 22 shown in FIG. 14, the nut 51 is screwed in the arrow B direction, similarly to the press fit processes of the first and second embodiment. With this, the pressing portion 50 is moved through the thrust bearing 52 in the arrow C direction, so that the inner circumference portion of the core metal portion 23 is press fit on the outer circumference portion of the intermediate shaft 11. As shown in FIG. 15, in a state in which the core metal portion 23 is press fit on the intermediate shaft 11, the axial end surface 23*a* of the core metal portion 23 is positioned on the slightly second end side of the annular recessed portion 11*d* of the intermediate shaft 11. The annular surface 50*g* of the annular protruding portion 50*a* of the pressing portion 50 on the second axial end side is abutted on the first axial end 55*f* of the first half portion 55 and the first axial end 56*f* of the second half portion 56.

Effects of Third Embodiment

In the third embodiment, the core metal portion 23 of the worm wheel 22 is fit on the outer circumference portion of the intermediate shaft 11 by using the third press fit device 54. At this press fit, the first protruding portion 55*e* of the first half portion 55 and the second protruding portion 56*e* of the second half portion 56 are mounted in the annular recessed portion 11*d* provided to the intermediate shaft 11. With this, the fixed shaft portion 49 is fixed to the intermediate shaft 11. Accordingly, it is possible to readily fix the fixed shaft portion 49 to the intermediate shaft 11 by the relatively simple mounting by the raised and recessed portions, without the forming of the screw, and the removal of the chip due to the forming of the screw.

Moreover, the worm wheel 22, the pressing portion 50, the thrust bearing 52, and the nut 51 are disposed in this order from the first axial end side of the fixed shaft portion 49 fixed to the intermediate shaft 11 as described above. Then, the nut 51 is rotated in the arrow B direction so that the core metal portion 23 is press fit on the outer circumference portion of the intermediate portion 11 while the pressing portion 50 is slidably moved on the outer circumference portions of the first half portion 55 and the second half portion 56. With this, it is possible to decrease the thrust force added to the intermediate shaft 11 relative to a case in which the pressing force is directly acted to the core metal portion 23 without using the fixed shaft portion 49. Accordingly, it is possible to suppress the damage of the second torsion bar fixed to the intermediate shaft 11.

Fourth Embodiment

Figure 16:
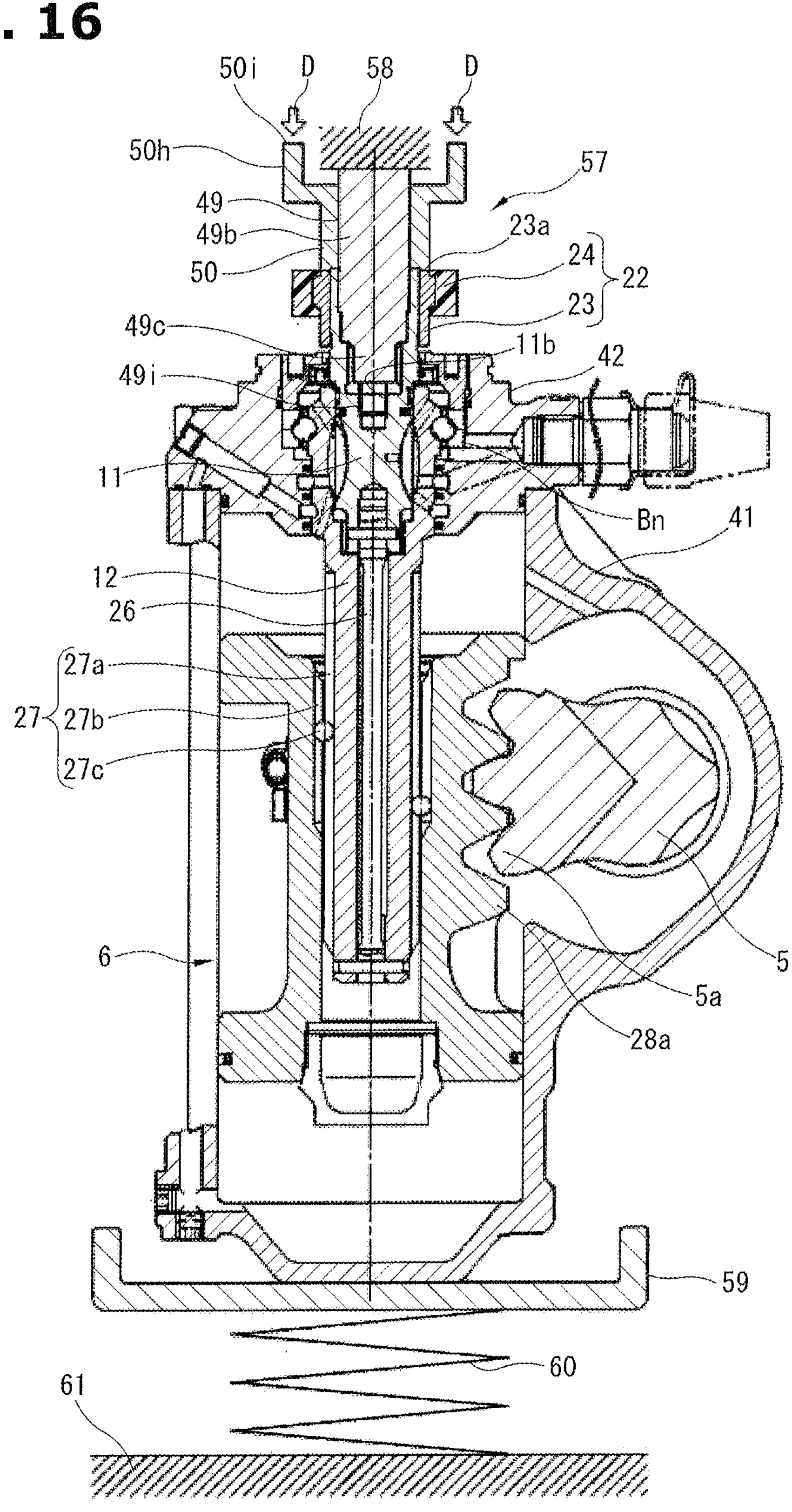
FIG. 16 is a process view showing a press fit process of the worm wheel according to a fourth embodiment.

FIG. 16 is a process view showing the press fit process of the worm wheel 22 according to the fourth embodiment.

In the fourth embodiment, the fourth press fit device 57 includes the fixed shaft portion 49 which is formed from removing the first end side shaft portion 49*a* from the fixed shaft portion 49 according to the first embodiment; and the pressing portion 50 including a first axial end side having a shape different from that of the pressing portion 50 according to the first embodiment.

As shown in FIG. 16, the first axial end portion of the central shaft portion 49*b* of the fixed shaft portion 49 is suspended from the fixed wall 58 provided in a workplace. On the other hand, the second end side shaft portion 49*c* of the fixed shaft portion 49 is fixed to the intermediate shaft 11 through the screw joint between the internal screw portion 11*b* of the intermediate shaft 11, and the external screw portion 49*i* of the second end side shaft portion 49*c*.

The pressing portion 50 includes an expansion first end portion 50*h* which is formed by extending the first end portion toward the first end side in the stepped diameter increasing shape. The axial end surface 50*i* of the expansion first end portion 50*h* which is continuous in the annular shape is a pressing surface to which the pressing force D is provided by the press machine (not shown).

Moreover, in this embodiment, the bottom portion of the output side housing 41 of the steering device is disposed on a receiver (saucer) 59. Furthermore, the receiver 59 is mounted through the spring 60 to a floor portion 61 of the work space. The spring 60 is configured to absorb the load acted to the intermediate shaft 11 at the press fit of the worm wheel 22.

In this fourth press fit device 57, a press machine (not shown) provides the pressing force D to the metal core portion 23 of the worm wheel 22. With this, the second axial end surface 23*a* of the pressing portion 50 is pressed toward the second end side, so that the core metal portion 23 of the worm wheel 22 is press fit on the outer circumference portion of the intermediate shaft 11.

Effects of Fourth Embodiment

In the fourth embodiment, the first axial end portion of the central shaft portion 49*b* is suspended from the fixation wall 58. The bottom portion of the output side housing 41 of the steering device is mounted through the receiver 59 and the spring 60 to the floor portion 61. In the thus-constructed steering device, the core metal portion 23 of the worm wheel 22 can be press fit on the outer circumference portion of the intermediate shaft 11 by the press machine. At this press fit, the load acted to the intermediate shaft 11 is absorbed by the spring 60. Accordingly, it is possible to suppress the damage of the second torsion bar 26 fixed to the intermediate shaft 11.

Fifth Embodiment

Figure 17:
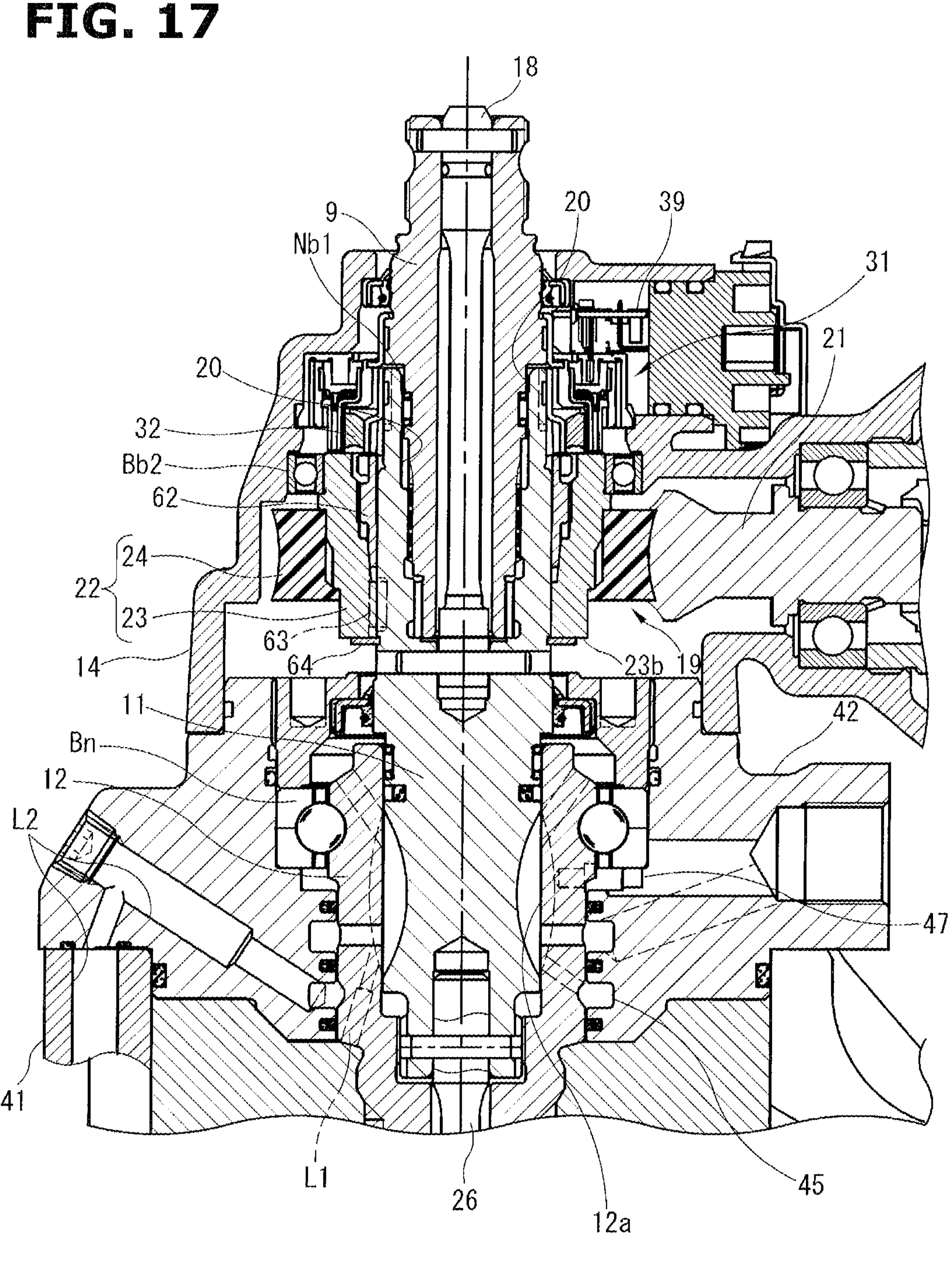
FIG. 17 is a longitudinal partial sectional view showing a steering device according to a fifth embodiment.

FIG. 17 is a longitudinal partial sectional view showing the steering device according to a fifth embodiment.

In this fifth embodiment, the connection shaft 10 in the first embodiment is omitted. The input shaft 9 is directly received within the receiving recessed portion 20 of the intermediate shaft 11 which has an axial length longer than that in the first embodiment.

Moreover, in this embodiment, the core metal portion 23 of the worm wheel 22 is not tightened with the outer circumference portion of the intermediate shaft 11 by the press fit. The core metal portion 23 is fixed and mounted on the outer circumference portion of the intermediate shaft 11 through a tapered screw 62 provided to the first end side, and a key 63 (shown by a dot line in FIG. 17) provided to the second end side. Moreover, a movement of the second axial end surface 23*b* of the core metal portion 23 toward the second end side is restricted by a fasten ring (retaining ring) 64 provided to the outer circumference portion of the intermediate shaft 11. Furthermore, the outer circumference portion of the first axial end portion of the core metal portion 23 is rotatably supported by a second ball bearing provided to the inner circumference portion of the input side housing 14.

Effects of Fifth Embodiment

In the fifth embodiment, the input shaft 9 and the intermediate shaft 11 are connected through the first torsion bar 18 without through the connection shaft. The electric motor 2 is configured to provide the rotation force through the speed reduction device 19 to the intermediate shaft 11. In the thus-constructed steering device according to the fifth embodiment, the rotation force from the electric motor 2 is directly acted to the intermediate shaft 11. It is possible to improve the response from the electric motor 2 to the intermediate shaft 11.

Sixth Embodiment

Figure 18:
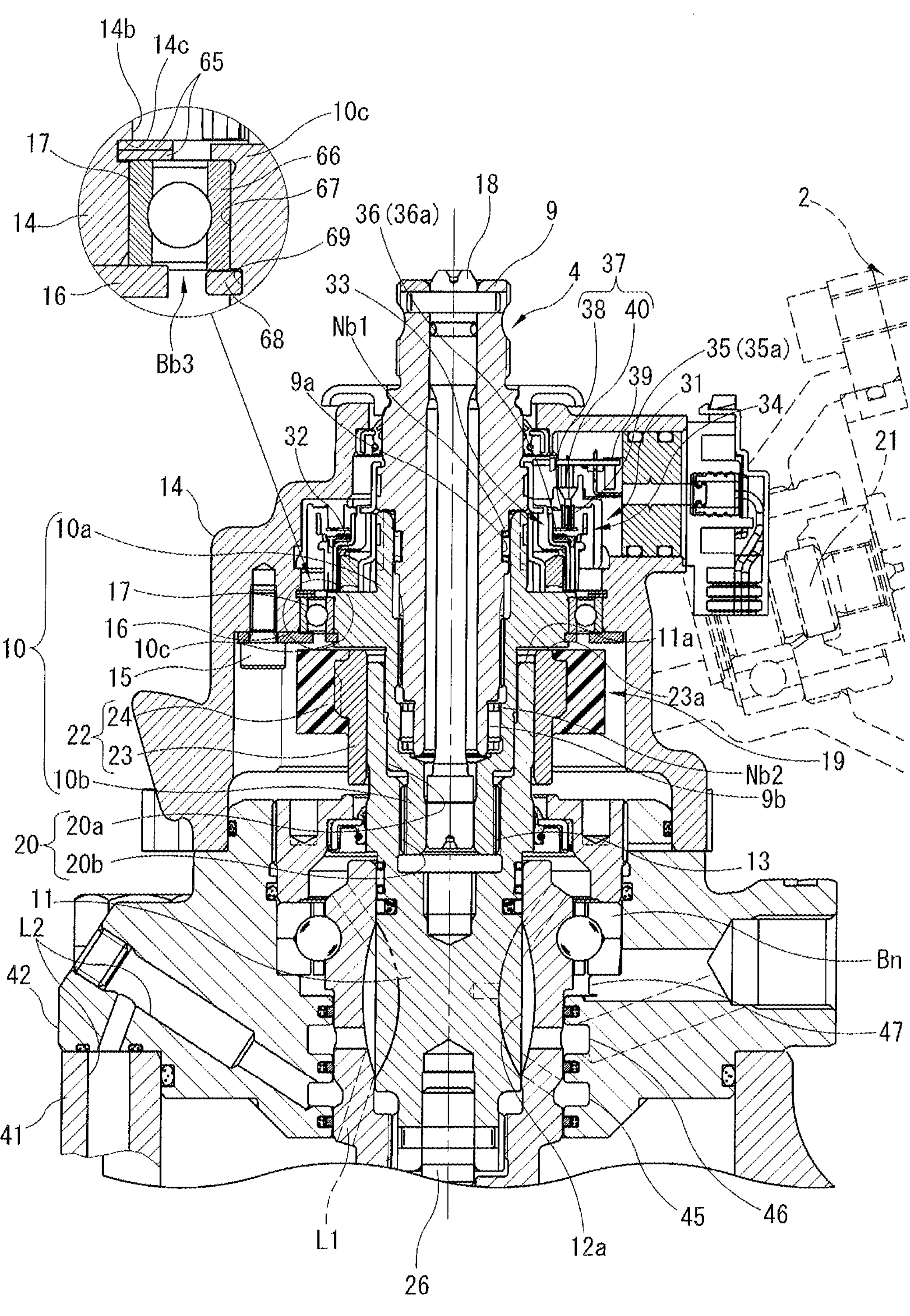
FIG. 18 is a longitudinal partial sectional view showing a steering device according to a sixth embodiment.

FIG. 18 is a longitudinal partial sectional view showing the steering device according to the sixth embodiment.

In the sixth embodiment, a third ball bearing Bb3 which has a size smaller than that of the first ball bearing Bb1 according to the first embodiment is used. Moreover, in the sixth embodiment, the stepped portion 14*a* in the first embodiment is omitted, the input side housing 14 includes an inner circumference surface 14*b* having a diameter slightly smaller than the outside diameter of the helical teeth portion 24.

The inner circumference surface 14*b* is continuous in the axial direction from a portion near a base portion of the bolt 15 to a position at which the inner circumference surface 14*b* is overlapped with a lower half portion of the permanent magnet 32 in the radial direction. An annular snap ring groove 14*c* is formed on the inner circumference surface 14*b* at a position slightly on the lower end side of the torque sensor 31. The snap ring 65 having, for example, the helical shape is mounted in the snap ring groove 14*c*. The outer race 17 of the third ball bearing Bb3 is pressed in the axial direction by the fasten ring (retaining ring) 16 which has a C-shape, and which is tightened by the bolt 15. With this, the snap ring 65 is configured to hold the outer race 17 with the fasten ring (retaining ring) 16. The snap ring 65 may be a C-shaped snap ring.

The outer circumference portion of the annular protruding portion 10*c* includes an inner race mounting groove portion 67 in which the inner race 66 of the third ball bearing Bb3 is mounted; and a receiving recessed groove portion 69 which is adjacent to the inner race mounting groove portion 67 in the axial direction, and which receives the C-shaped fasten ring 68. The fasten ring 68 is configured to press the inner race 66 toward the first end side with respect to the side wall of the inner race mounting groove portion 67, and thereby to hold the inner race 66. As shown in FIG. 18, in a state in which the inner race 66 is held, the inner race 66 is overlapped with the magnetism collecting ring 35 of the torque sensor 31 in the axial direction.

Effects of Sixth Embodiment

In the sixth embodiment, the snap ring 65 is provided in the snap ring groove 14*c* of the input side housing 14. The outer race 17 is pressed against the snap ring 65 by the fasten ring 16 (retaining ring 16). With this, the outer race 17 is held.

In this case, the fixing method of the first ball bearing Bb1 according to the first embodiment is explained. In the first embodiment, the condition (requirement) of the support of the connection shaft 10 is originally satisfied even when the rated load of the ball bearing is small. However, the first ball bearing Bb1 having the large rated load is used to avoid the interference with the worm shaft 21. The first ball bearing Bb1 is pressed and held against the stepped portion 14*a* of the input side housing 14 by the fasten ring (retaining ring) 16.

However, when the third ball bearing Bb3 having the small rated load is used like the sixth embodiment, it is unnecessary to provide the stepped portion 14*a* in the first embodiment. The inside diameter of the inner circumference surface 14*b* of the input side housing 14 becomes small. It is necessary to provide a new fixation portion for fixing the third ball bearing Bb3 to the inner circumference surface 14*b*. Accordingly, in the sixth embodiment, the snap ring groove 14*c* in which the snap ring 65 is mounted is formed on the inner circumference surface 14*b*.

In this way, the stepped portion 14*a* in the first embodiment is omitted. The third ball bearing Bb3 is fixed by using the snap ring 65. With this, it is possible to decrease the radial size of the steering device by the amount of the omission of the stepped portion 14*a*, and to decrease the manufacturing cost of the steering device.

Moreover, the third ball bearing Bb3 having the small size is used. The inner race 66 of the third ball bearing Bb3 can be disposed on more inner side in the radial direction to avoid the interference between the third ball bearing Bb3 and the lower end portion of the torque sensor 31. Accordingly, it is possible to further decrease the radial size of the steering device, and to further decrease the manufacturing cost of the steering device.

The invention claimed is:

1. A steering device comprising:

a steering shaft configured to receive a rotation force from a steering wheel;

a transmitting mechanism configured to transmit the rotation of the steering shaft to a steered wheel;

a power cylinder which includes a piston provided in the transmitting mechanism, and a pair of fluid chambers defined by the piston, and which is configured to provide a steering force for turning the steered wheel;

a rotary valve configured to selectively supply a hydraulic fluid to the pair of the fluid chambers in accordance with the rotation of the steering shaft;

an electric motor configured to provide a rotation force through a speed reduction device to the steering shaft; and the speed reduction device including a worm shaft and a worm wheel, the steering shaft including a first shaft connected to the steering wheel, and a second shaft connected to the first shaft, and configured to output the rotation force inputted from the first shaft, to the transmitting mechanism side, the worm wheel being fastened to the second shaft, and the second shaft constituting the rotary valve.

2. The steering device as claimed in claim 1, wherein the first shaft and the second shaft are connected with each other through a torsion bar.

3. The steering device as claimed in claim 2, wherein the second shaft is made from a metal material; the speed reduction device includes the worm wheel including a cylindrical core metal portion made from a metal material; and the core metal portion is tightened on an outer circumference portion of the second shaft by a press fit.

4. The steering device as claimed in claim 3, wherein the second shaft includes a receiving recessed portion formed on an axial end surface positioned on the first shaft side; and an inner circumference of the receiving recessed portion includes an internal screw portion engaged with an external screw portion of a press fit device for the press fit of the core metal portion.

5. The steering device as claimed in claim 3, wherein the second shaft includes an annular recessed portion formed on an outer circumference surface of the second shaft; and a protruding portion of a press fit device for the press fit of the core metal portion is mounted in the annular recessed portion.

6. The steering device as claimed in claim 2, wherein the second shaft is made from a metal material; the speed reduction device includes the worm wheel including a cylindrical core metal portion made from a metal material; and the core metal portion is tightened on an outer circumference portion of the second shaft by a shrink fit or a cool fit.

7. The steering device as claimed in claim 1, wherein the first shaft and the second shaft are connected through a torsion bar, and a cylindrical connection shaft provided around the torsion bar.

8. The steering device as claimed in claim 7, wherein the second shaft is made from a metal material; the speed reduction device includes the worm wheel including a cylindrical core metal portion formed from a metal material; and the core metal portion is tightened on an outer circumference portion of the second shaft by the press fit.

9. The steering device as claimed in claim 8, wherein the second shaft includes a receiving recessed portion formed on an axial end surface positioned on the first shaft side; and the inner circumference surface of the receiving recessed portion includes an internal screw portion engaged with an external screw portion of a press fit device for the press fit of the core metal portion.

10. The steering device as claimed in claim 8, wherein the second shaft includes an annular recessed portion formed on an outer circumference surface of the second shaft; and a protruding portion of a press fit device for the press fit of the core metal portion is mounted in the annular recessed portion.

11. The steering device as claimed in claim 7, wherein the second shaft is made from a metal material; the speed reduction device includes the worm wheel including a cylindrical core metal portion made from a metal material; and the core metal portion is mounted in an outer circumference portion of the second shaft by a shrink fit or a cool fit.

12. The steering device as claimed in claim 7, wherein the second shaft include a receiving recessed portion formed on an axial end surface positioned on the first shaft side; and the connection shaft is inserted in the receiving recessed portion.

13. The steering device as claimed in claim 7, wherein the steering device further comprises a housing receiving the steering shaft; a ball bearing which is provided to the housing, and which rotatably supports the connection shaft, a snap ring which is provided to an inner circumference surface of the housing, and which supports an outer race of the ball bearing, and a fasten ring configured to press the outer race of the ball bearing to the snap ring.

* * * * *